United States Patent
Kim et al.

(10) Patent No.: US 9,622,291 B2
(45) Date of Patent: Apr. 11, 2017

(54) WIRELESS COMMUNICATION METHOD AND APPARATUS SUPPORTING MULTIPLE COMMUNICATION SERVICES

(71) Applicant: Samsung Electronics Co., Ltd., Gyeonggi-do (KR)

(72) Inventors: Hyejeong Kim, Gyeonggi-do (KR); Yunsang Park, Gyeonggi-do (KR); Juyeong Lee, Seoul (KR); Jinhong Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 246 days.

(21) Appl. No.: 14/299,342

(22) Filed: Jun. 9, 2014

(65) Prior Publication Data

US 2014/0364165 A1  Dec. 11, 2014

(30) Foreign Application Priority Data

| Jun. 11, 2013 | (KR) | 10-2013-0066847 |
| Sep. 13, 2013 | (KR) | 10-2013-0110730 |
| Oct. 23, 2013 | (KR) | 10-2013-0126829 |
| Apr. 11, 2014 | (KR) | 10-2014-0043331 |

(51) Int. Cl.
*H04M 1/00* (2006.01)
*H04W 88/06* (2009.01)
(Continued)

(52) U.S. Cl.
CPC ....... *H04W 88/06* (2013.01); *H04W 36/0022* (2013.01); *H04W 24/02* (2013.01); *H04W 48/20* (2013.01)

(58) Field of Classification Search
CPC ........ H04B 1/44; H04B 7/0817; H04B 7/082; H04B 7/0871; H04B 17/309; H04B 17/382; H04B 7/0608; H04B 7/0689; H04B 7/0802; H04B 7/0814; H04B 7/0825; H04W 52/02; H04W 52/028; H04W 64/00; H04W 88/08;
(Continued)

(56) References Cited

U.S. PATENT DOCUMENTS

| 2011/0199915 A1* | 8/2011 | Santhanam ........... H04W 68/00 370/252 |
| 2013/0016632 A1* | 1/2013 | Mujtaba ............... H04B 7/0608 370/275 |

(Continued)

*Primary Examiner* — Golam Sorowar
(74) *Attorney, Agent, or Firm* — The Farrell Law Firm, P.C.

(57) ABSTRACT

A wireless communication method and an electronic device are provided. The electronic device includes a transmission module for transmitting a signal to a Circuit Switching (CS) network or a signal to a Packet Switching (PS) network; a first reception module and a second reception module for receiving a signal from the CS network or the PS network; and a communication control module for controlling the transmission module, the first reception module, and the second reception module, wherein, when a signal of the PS network is received through at least one of the first reception module and the second reception module, the communication control module at least temporarily receives a signal received from the CS network in preference to the signal received from the PS network through at least one of the first reception module and the second reception module.

25 Claims, 19 Drawing Sheets

(51) Int. Cl.
*H04W 36/00* (2009.01)
*H04W 48/20* (2009.01)
*H04W 24/02* (2009.01)

(58) Field of Classification Search
CPC . H04W 24/00; H04W 36/0011; H04W 36/14; H04W 48/16; H04W 68/00; H04W 68/12; H04W 76/02; H04W 76/028; H04W 88/02; H04W 88/06
See application file for complete search history.

(56) References Cited

U.S. PATENT DOCUMENTS

| | | | |
|---|---|---|---|
| 2013/0064151 A1* | 3/2013 | Mujtaba | H04B 7/0817 370/311 |
| 2013/0244660 A1* | 9/2013 | Kumar | H04W 36/165 455/436 |
| 2014/0308986 A1* | 10/2014 | Yang | H04W 88/06 455/552.1 |

* cited by examiner

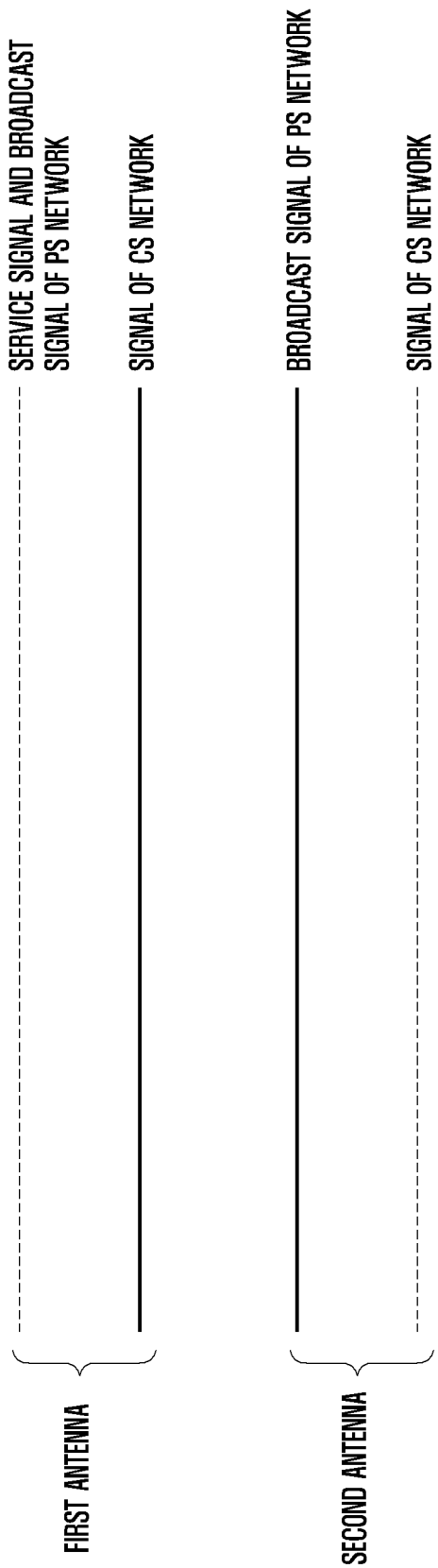

WIRELESS COMMUNICATION METHOD AND APPARATUS SUPPORTING MULTIPLE COMMUNICATION SERVICES

PRIORITY

This application claims priority under 35 U.S.C. 119(a) to Korean Patent Applications filed in the Korean Intellectual Property Office on Jun. 11, 2013, Sep. 13, 2013, Oct. 23, 2013 and Apr. 11, 2014, and assigned Serial Nos. 10-2013-0066847, 10-2013-0110730, 10-2013-0126829 and 10-2014-0043331, respectively, the entire contents of each of which are incorporated herein by reference.

BACKGROUND OF THE INVENTION

1. Field of the Invention

The present disclosure relates generally to a communication method and apparatus, and more particularly to a wireless communication method and apparatus.

2. Description of the Related Art

A wireless communication system has been developed from an initial wireless communication system providing a service based on a voice to a wireless communication system providing a high speed and high quality packet data service, as set forth in communication standards such as a High Speed Packet Access (HSPA) of 3rd Generation Partnership Project (3GPP), Long Term Evolution (LTE), High Rate Packet Data (HRPD) of 3GPP2, Ultra Mobile Broadband (UMB), and Institute of Electrical and Electronics Engineers (IEEE) 802.16e.

According to the development of the wireless communication system, electronic devices (for example, user devices such as a mobile phone, a tablet computer, a personal computer and the like) supporting wireless communication may include a plurality of communication systems to communicate with multiple communication networks. For example, a Circuit Switching (CS) network (for example, a voice service through a CDMA1x network) providing a voice call service and a Packet Switching (PS) network (for example, a data service through LTE) providing a data transmission/reception service may coexist.

Further, according to the development of the wireless communication system, a communication technology using a plurality of antennas instead of one antenna has been developed and a technology for more efficiently reconstructing a physical signal to data is also being developed. For example, as one type of reception method using a plurality of antennas, there is a diversity reception method. The diversity reception method acquires a plurality of reception signals by receiving the same signal through different paths and acquires a gain by combining the plurality of reception signals. The paths may be distinguished according to various ways through space, time, frequency and the like. For example, when a plurality of antennas are used, a plurality of paths are spatially formed. When the plurality of antennas are used, a plurality of hardware modules for processing signals received through the respective antennas are required. That is, the signals received through the respective antennas are processed through different hardware modules, so that independence of the paths is secured and gains generated when the signals are combined can increase.

Further, the wireless communication system performs Carrier Aggregation (CA) by using a plurality of antennas and thus improves reception capability. CA refers to a method of performing communication with a wide bandwidth through the simultaneous use of carriers of different frequencies. When a plurality of carriers are used through CA, each of the carriers is referred to as a Carrier Component (CC). Since resources of each of the carriers are independently scheduled, an electronic device may simultaneously receive different pieces of data through respective carriers. To this end, an electronic device supporting CA may include transmission/reception modules corresponding to the respective carriers.

According to the prior art, when an electronic device provides a plurality of (for example, two) communication services, components suitable for the respective communication systems (for example, a Radio Frequency Integrated Chip (RFIC) and an antenna) are required to be mounted to the electronic device. Accordingly, a size of the electronic device increases or a manufacturing cost of the electronic device increases. Further, according to the prior art, as a number of components increases even though a space within the electronic device is limited, a space to mount the components is not sufficient. Accordingly, in order to secure the space for the components, a size of a component, such as the antenna, is reduced. As a result, this causes deterioration of the capability of the electronic device. Further, since a plurality of antennas are mounted within a narrow space, the capability of the electronic device also deteriorates due to interference between the antennas.

SUMMARY OF THE INVENTION

The present disclosure has been made to address the above problems and disadvantages, and to provide at least the advantages described below. Accordingly, an aspect of the present disclosure is to provide a wireless communication method and apparatus that can secure the capability of the electronic device with a small cost by supporting a plurality of communication network systems only by a small number of components.

Another aspect of the present disclosure is to provide a wireless communication method and apparatus that can control a size of the antenna by securing a space where the antenna is mounted, thereby improving the capability of the electronic device and contributing to miniaturization of the electronic device.

In accordance with an aspect of the present disclosure, an electronic device is provided. The electronic device includes a transmission module for transmitting a signal to a Circuit Switching (CS) network or a signal to a Packet Switching (PS) network; a first reception module and a second reception module for receiving a signal from the CS network or the PS network; and a communication control module for controlling the transmission module, the first reception module, and the second reception module, wherein, when a signal of the PS network is received through at least one of the first reception module and the second reception module, the communication control module at least temporarily receives a signal received from the CS network in preference to the signal received from the PS network through at least one of the first reception module and the second reception module.

In accordance with another aspect of the present disclosure, an electronic device is provided. The electronic device includes a first communication module and a second communication module for transmitting and receiving a first signal of a first communication network or a second signal of a second communication network; and a communication control module for controlling the first communication module and the second communication module, wherein, when a signal is transmitted to the first communication network through at least one of the first communication module and the second communication module, the communication control module at least temporarily receives a signal of the second communication network through at least one of the first communication module and the second communication module.

In accordance with another aspect of the present disclosure, an electronic device is provided. The electronic device includes a transmission module for transmitting a signal to a CS network or a PS network; and a first reception module and a second reception module for receiving a signal from the CS network or the PS network, wherein, when the transmission module transmits a first CS network signal to the CS network, the first reception module and the second reception module at least temporarily receive a second CS network signal from the CS network and the second reception module at least temporarily receives a first PS network signal from the PS network.

In accordance with another aspect of the present disclosure, an electronic device is provided. The electronic device includes a transmission module for transmitting a signal to a CS network or a signal to a PS network; a first reception module and a second reception module for receiving a signal from the CS network or the PS network; and a communication control module for controlling the transmission module, the first reception module, and the second reception module, wherein, when a signal of the CS network is received through one of the first reception module and the second reception module, the communication control module receives a broadcast signal or a multicast signal of the PS network through the other one of the first reception module and the second reception module.

In accordance with another aspect of the present disclosure, an electronic device is provided. The electronic device includes a plurality of reception modules for receiving a signal of a CS network or a PS network, wherein, when the plurality of reception modules receive a broadcast signal of the PS network and then a part of the plurality of reception modules receives a signal of the CS network, another part of the plurality of reception modules maintains the reception of the broadcast signal of the PS network.

In accordance with another aspect of the present disclosure, a method of an electronic device is provided. The method includes transmitting a signal to a CS network or a PS network; and receiving a signal from the CS network or the PS network through a first reception module or a second reception module, wherein receiving the signal includes at least temporarily receiving the signal of the CS network through at least one of the first reception module and the second reception module when the signal of the PS network is received through at least one of the first reception module and the second reception module.

BRIEF DESCRIPTION OF THE DRAWINGS

The above and other aspects, features and advantages of the present disclosure will be more apparent from the following detailed description in conjunction with the accompanying drawings, in which:

FIGS. 14A and 14B illustrate, when a paging signal of one communication network is received, data throughput of another communication network according to various embodiments of the present disclosure;

DETAILED DESCRIPTION OF EMBODIMENTS

Figure 1:
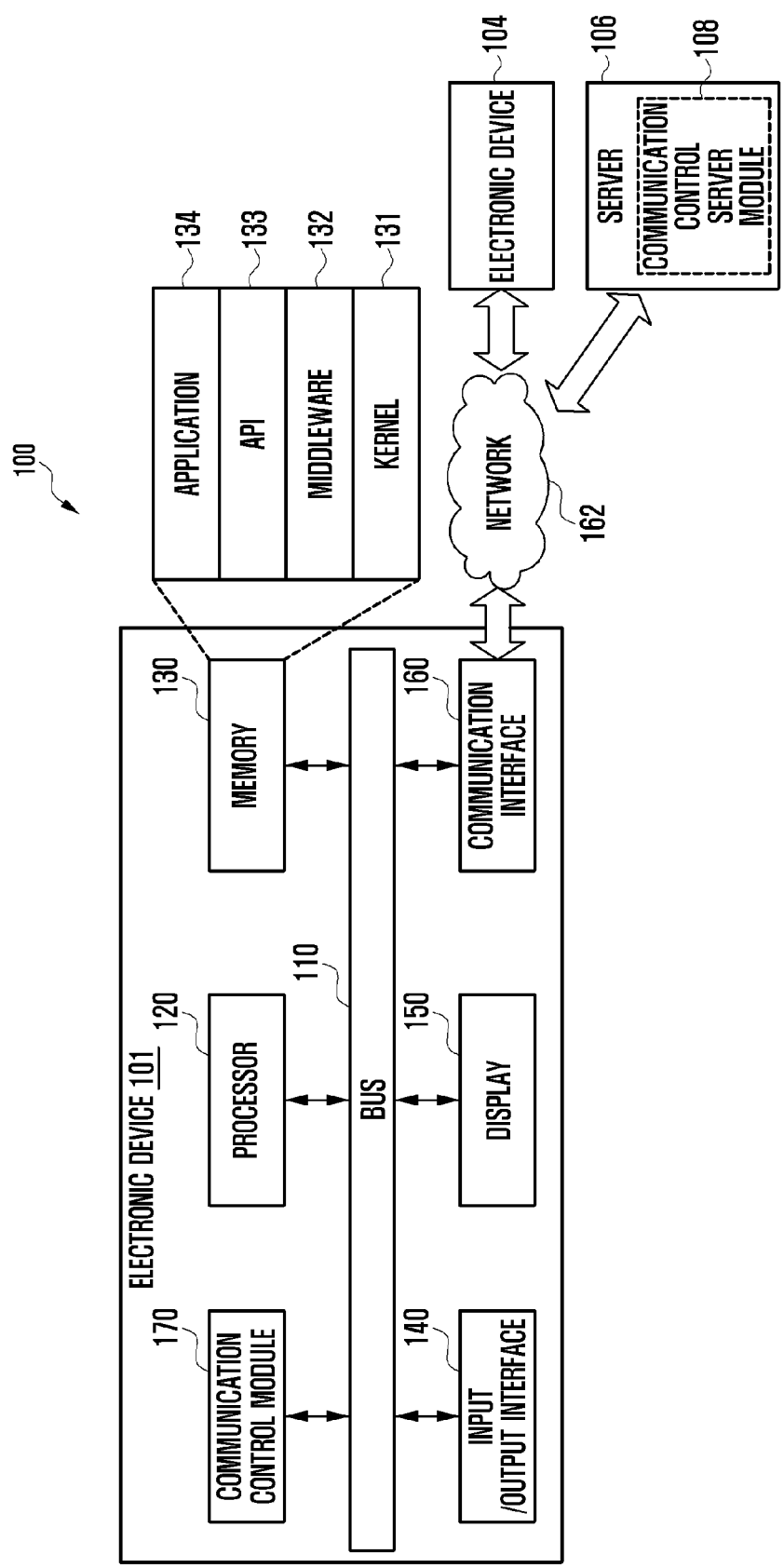
FIG. 1 illustrates a network environment including an electronic device according to various embodiments of the present disclosure.

Hereinafter, the present disclosure will be described with reference to the accompanying drawings. Although specific embodiments are illustrated in the drawings and related detailed descriptions are discussed in the present specification, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

The term "include" or "may include" which may be used in describing various embodiments of the present disclosure refers to the existence of a corresponding disclosed function, operation or component which can be used in various embodiments of the present disclosure and does not limit one or more additional functions, operations, or components. In various embodiments of the present disclosure, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

The terms used in describing various embodiments of the present disclosure are only examples for describing a specific embodiment but do not limit the various embodiments of the present disclosure. Singular forms are intended to include plural forms unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various embodiments of the present disclosure may be a device including a communication function. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a camera, a wearable device (for example, a Head-Mounted-Device (HMD) such as electronic glasses, electronic clothes, and electronic bracelet, an electronic necklace, an electronic appcessary, an electronic tattoo, and a smart watch.

According to some embodiments, the electronic device may be a smart home appliance having a communication function. The smart home appliance may include at least one of a TeleVision (TV), a Digital Video Disk (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, and an electronic frame.

According to some embodiments, the electronic device may include at least one of various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some embodiments, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a camera function. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments of the present disclosure will be described with reference to the accompanying drawings. The term "user" used in various embodiments may refer to a person who uses an electronic device or a device (for example, an artificial intelligence electronic device) which uses an electronic device.

FIG. 1 illustrates a network environment 100 including an electronic device 101 according to various embodiments of the present disclosure. Referring to FIG. 1, the electronic device 101 includes a bus 110, a processor 120, a memory 130, an input/output interface 140, a display 150, a communication interface 160, and a communication control module 170.

The bus 110 may be a circuit connecting the above described components and transmitting communication (for example, a control message) between the above described components.

The processor 120 receives commands from other components (for example, the memory 130, the input/output interface 140, the display 150, the communication interface 160, or the communication control module 170) through the bus 110, analyzes the received commands, and executes calculation or data processing according to the analyzed commands.

The memory 130 stores commands or data received from the processor 120 or other components (for example, the input/output interface 140, the display 150, the communication interface 160, or the communication control module 170) or generated by the processor 120 or other components. The memory 130 may include programming modules, for example, a kernel 131, middleware 132, an Application Programming Interface (API) 133, and an application 134. Each of the aforementioned programming modules may be implemented by software, firmware, hardware, or a combination of two or more thereof.

The kernel 131 controls or manages system resources (for example, the bus 110, the processor 120, or the memory 130) used for executing an operation or function implemented by the remaining other programming modules, for example, the middleware 132, the API 133, or the application 134. Further, the kernel 131 provides an interface for accessing individual components of the electronic device 101 from the middleware 132, the API 133, or the application 134 to control or manage the components.

The middleware 132 performs a relay function of allowing the API 133 or the application 134 to communicate with the kernel 131 to exchange data. Further, in operation requests received from the application 134, the middleware 132 performs a control for the operation requests (for example, scheduling or load balancing) by using a method of assigning a priority, by which system resources (for example, the bus 110, the processor 120, the memory 130 and the like) of the electronic device 101 can be used, to the application 134.

The API 133 is an interface by which the application 134 can control a function provided by the kernel 131 or the middleware 132 and includes, for example, at least one interface or function (for example, command) for a file control, a window control, image processing, or a character control.

According to various embodiments, the application 134 may include a Short Message Service (SMS)/Multimedia Messaging Service (MMS) application, an email application, a calendar application, an alarm application, a health care application (for example, application measuring quantity of exercise or blood sugar) or an environment information application (for example, application providing information on barometric pressure, humidity or temperature). Additionally or alternatively, the application 134 may be an application related to an information exchange between the electronic device 101 and an external electronic device (for example, electronic device 104). The application related to the information exchange may include, for example, a notification relay application for transferring particular information to the external electronic device or a device management application for managing the external electronic device.

For example, the notification relay application may include a function of transmitting notification information generated by another application (for example, an SMS/MMS application, an email application, a health care application or an environment information application) of the electronic device 101 to the external electronic device (for example, electronic device 104). Additionally or alternatively, the notification relay application may receive notification information from, for example, the external electronic device 104 and provide the received notification information to the user. The device management application may manage (for example, install, remove, or update) at least a part of functions (for example, turning on/off the external electronic device (or some components of the external electronic device) or controlling a brightness of the display) of the external electronic device (104 communicating with the electronic device 101, an application executed in the external electronic device 104, or a service (for example, call service or message service) provided by the external electronic device 104.

According to various embodiments, the application 134 may include an application designated according to an attribute (for example, type of electronic device) of the external electronic device 104. For example, when the external electronic device 104 is an MP3 player, the application 134 may include an application related to music reproduction. Similarly, when the external electronic device 104 is a mobile medical device, the application 134 may include an application related to health care. According to an embodiment, the application 134 may include at least one of an application designated to the electronic device 101 and an application received from an external electronic device (for example, server 106 or electronic device 104).

The input/output interface 140 transmits a command or data input from the user through an input/output device (for example, a sensor, a keyboard, or a touch screen) to the processor 120, the memory 130, the communication interface 160, or the display control module 170 through, for example, the bus 110. For example, the input/output interface 140 may provide data on a user's touch input through a touch screen to the processor 120. Further, the input/output interface 140 may output a command or data received, through, for example, the bus 110, from the processor 120, the memory 130, the communication interface 160, or the communication control module 170 through the input/output device (for example, a speaker or a display). For example, the input/output interface 140 may output voice data processed through the processor 120 to the user through the speaker.

The display 150 displays various pieces of information (for example, multimedia data, text data, or the like) for the user.

The communication interface 160 connects communication between the electronic device 101 and the external device (for example, electronic device 104 or server 106). For example, the communication interface 160 may access a network 162 through wireless or wired communication to communicate with the external device. The wireless communication includes at least one of, for example, WiFi, BlueTooth (BT), Near Field Communication (NFC), a Global Positioning System (GPS), and cellular communication (for example, LTE, LTE-A, CDMA, WCDMA, UMTS, WiBro or GSM). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment, the network 162 may be a telecommunication network. The telecommunication network includes at least one of a computer network, Internet, Internet of things, and a telephone network. According to an embodiment, a protocol (for example, transport layer protocol, data link layer protocol, or physical layer protocol) for communication between the electronic device 101 and the external device may be supported by at least one of the application 134, the application programming interface 133, the middleware 132, the kernel 131, and the communication interface 160.

According to an embodiment, the server 106 supports driving of the electronic device 101 by performing at least one operation (or function) implemented by the electronic device 101. For example, the server 106 may include a communication control server module 108 that supports the communication control module 170 implemented in the electronic device 101. For example, the communication control server module 108 may include at least one of the components of the communication control module 170 to perform (on behalf of) at least one operations performed by the communication control module 170.

Figure 2:
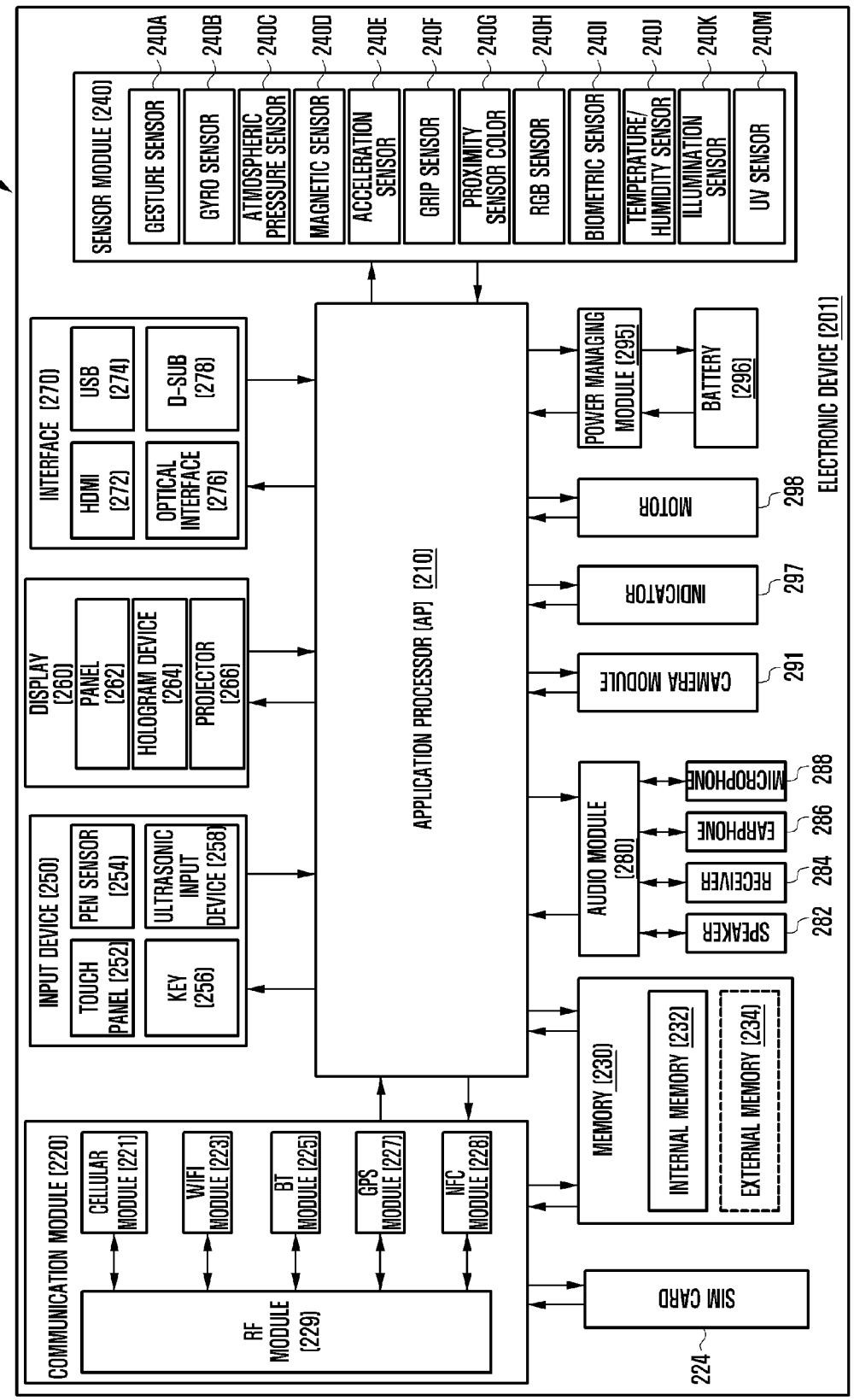
FIG. 2 is a block diagram of an electronic device according to various embodiments of the present disclosure.

FIG. 2 is a block diagram 200 of an electronic device 201 according to various embodiments of the present disclosure. The electronic device 201 may configure, for example, a whole or a part of the electronic device 101 illustrated in FIG. 1. Referring to FIG. 2, the electronic device 201 includes one or more Application Processors (APs) 210, a communication module 220, a Subscriber Identification Module (SIM) card 224, a memory 230, a sensor module 240, an input device 250, a display 260, an interface 270, an audio module 280, a camera module 291, a power managing module 295, a battery 296, an indicator 297, and a motor 298.

The AP 210 operates an operating system (OS) or an application program so as to control a plurality of hardware or software component elements connected to the AP 210 and execute various data processing and calculations including multimedia data. The AP 210 may be implemented by, for example, a System on Chip (SoC). According to an embodiment, the processor 210 may further include a Graphic Processing Unit (GPU).

The communication module 220 (for example, communication interface 160) transmits/receives data in communication between different electronic devices (for example, the electronic device 104 and the server 106) connected to the electronic device 201 (for example, electronic device 101) through a network. According to an embodiment, the communication module 220 includes a cellular module 221, a WiFi module 223, a BlueTooth (BT) module 225, a Global Positioning System (GPS) module 227, a Near Field Communication (NFC) module 228, and a Radio Frequency (RF) module 229.

The cellular module 221 provides a voice, a call, a video call, a Short Message Service (SMS), or an Internet service through a communication network (for example, Long Term Evolution (LTE), LTE-A, Code Division Multiple Access (CDMA), Wideband CDMA (WCDMA), UMTS, WiBro, GSM or the like). Further, the cellular module 221 may distinguish and authenticate electronic devices within a communication network by using a subscriber identification module (for example, the SIM card 224). According to an embodiment, the cellular module 221 performs at least some of the functions which can be provided by the AP 210. For example, the cellular module 221 may perform at least some of the multimedia control functions.

According to an embodiment, the cellular module 221 may include a Communication Processor (CP). Further, the cellular module 221 may be implemented by, for example, an SoC.

Figure 8:
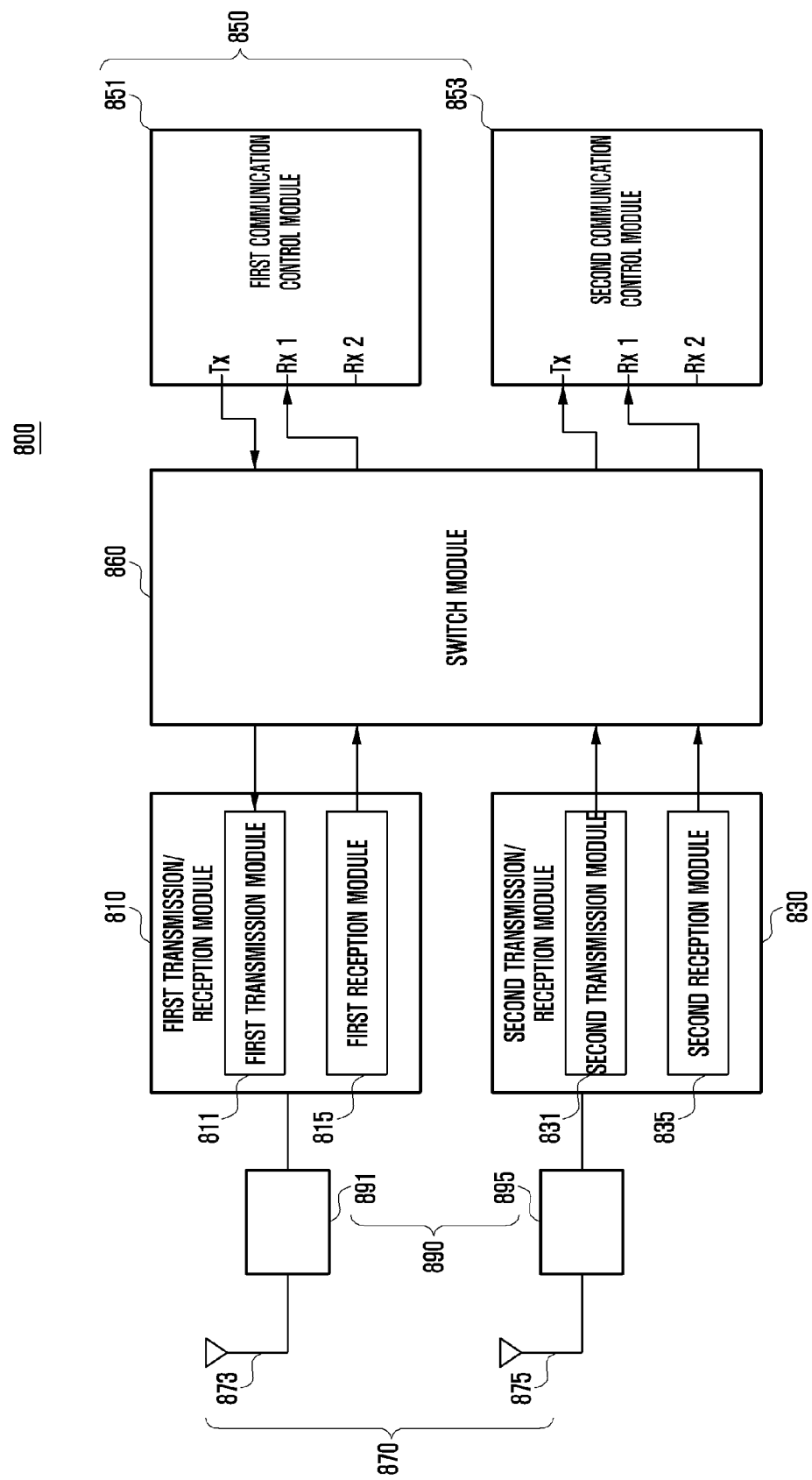
FIG. 8 is a block diagram of an electronic device according to various embodiments of the present disclosure.

Although the components such as the cellular module 221 (for example, communication processor), the memory 230, and the power managing module 295 are illustrated as components separate from the AP 210 in FIG. 8, the AP 210 may include at least some (for example, cellular module 221) of the aforementioned components in an embodiment.

According to an embodiment, the AP 210 or the cellular module 221 (for example, communication processor) may load a command or data received from at least one of a non-volatile memory and other components connected to each of the AP 210 and the cellular module 221 to a volatile memory and process the loaded command or data. Further, the AP 210 or the cellular module 221 may store data received from at least one of other components or generated by at least one of other components in a non-volatile memory.

Each of the WiFi module 223, the BT module 225, the GPS module 227, and the NFC module 228 may include, for example, a processor for processing data transmitted/received through the corresponding module. Although the cellular module 221, the WiFi module 223, the BT module 225, the GPS module 227, and the NFC module 228 are illustrated as blocks separate from each other in FIG. 8, at least some (for example, two or more) of the cellular module 221, the WiFi module 223, the BT module 225, the GPS module 227, and the NFC module 228 may be included in one Integrated Chip (IC) or one IC package according to one embodiment. For example, at least some (for example, the communication processor corresponding to the cellular module 221 and the WiFi processor corresponding to the WiFi module 223) of the processors corresponding to the cellular module 221, the WiFi module 223, the BT module 225, the GPS module 227, and the NFC module 228 may be implemented by one SoC.

The RF module 229 transmits/receives data, for example, an RF signal. Although not illustrated, the RF module 229 may include, for example, a transceiver, a Power Amp Module (PAM), a frequency filter, a Low Noise Amplifier (LNA) or the like. Further, the RF module 229 may further include a component for transmitting/receiving electronic waves over a free air space in wireless communication, for example, a conductor, a conducting wire, or the like. Although the cellular module 221, the WiFi module 223, the BT module 225, the GPS module 227, and the NFC module 228 share one RF module 229 in FIG. 2, at least one of the cellular module 221, the WiFi module 223, the BT module 225, the GPS module 227, and the NFC module 228 may transmit/receive an RF signal through a separate RF module according to one embodiment.

The SIM card 224 is a card including a Subscriber Identification Module and may be inserted into a slot formed in a particular portion of the electronic device. The SIM card 224 includes unique identification information (for example, Integrated Circuit Card IDentifier (ICCID)) or subscriber information (for example, International Mobile Subscriber Identity (IMSI).

The memory 230 (for example, memory 130) may include an internal memory 232 or an external memory 234. The internal memory 232 may include, for example, at least one of a volatile memory (for example, a Random Access Memory (RAM), a dynamic RAM (DRAM), a static RAM (SRAM), a synchronous dynamic RAM (SDRAM), and the like), and a non-volatile Memory (for example, a Read Only Memory (ROM), a one time programmable ROM (OTPROM), a programmable ROM (PROM), an erasable and programmable ROM (EPROM), an electrically erasable and programmable ROM (EEPROM), a mask ROM, a flash ROM, a NAND flash memory, an NOR flash memory, and the like).

According to an embodiment, the internal memory 232 may be a Solid State Drive (SSD). The external memory 234 may further include a flash drive, for example, a Compact Flash (CF), a Secure Digital (SD), a Micro Secure Digital (Micro-SD), a Mini Secure Digital (Mini-SD), an extreme Digital (xD), or a memory stick. The external memory 234 may be functionally connected to the electronic device 201 through various interfaces. According to an embodiment, the electronic device 201 may further include a storage device (or storage medium) such as a hard drive.

The sensor module 240 measures a physical quantity or detects an operation state of the electronic device 201, and converts the measured or detected information to an electronic signal. The sensor module 240 may include, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H (for example, Red, Green, and Blue (RGB) sensor) 240H, a biometric sensor 240I, a temperature/humidity sensor 240J, an illumination (light) sensor 240K, and a Ultra Violet (UV) sensor 240M. Additionally or alternatively, the sensor module 240 may include, for example, a E-nose sensor, an electromyography (EMG) sensor, an electroencephalogram (EEG) sensor, an electrocardiogram (ECG) sensor, an Infra-Red (IR) sensor, an iris sensor, a fingerprint sensor (not illustrated), and the like. The sensor module 240 may further include a control circuit for controlling one or more sensors included in the sensor module 240.

The input device 250 includes a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 can recognize proximity as well as a direct touch. The touch panel 252 may further include a tactile layer. In this event, the touch panel 252 provides a tactile reaction to the user.

The (digital) pen sensor 254 may be implemented, for example, using a method identical or similar to a method of receiving a touch input of the user, or using a separate recognition sheet. The key 256 may include, for example, a physical button, an optical key, or a key pad. The ultrasonic input device 258 is a device which can detect an acoustic wave by a microphone (for example, microphone 288) of the electronic device 201 through an input means generating an ultrasonic signal to identify data and can perform wireless recognition. According to an embodiment, the electronic device 201 receives a user input from an external device (for example, computer or server) connected to the electronic device 201 by using the communication module 220.

The display 260 (for example, display 150) includes a panel 262, a hologram device 264, and a projector 266. The panel 262 may be, for example, a Liquid Crystal Display (LCD) or an Active Matrix Organic Light Emitting Diode (AM-OLED). The panel 262 may be implemented to be, for example, flexible, transparent, or wearable. The panel 262 may be configured by the touch panel 252 and one module. The hologram device 264 shows a stereoscopic image in the air by using interference of light. The projector 266 projects light on a screen to display an image. For example, the screen may be located inside or outside the electronic device 201. According to an embodiment, the display 260 may further include a control circuit for controlling the panel 262, the hologram device 264, and the projector 266.

The interface 270 includes, for example, a High-Definition Multimedia Interface (HDMI) 272, a Universal Serial Bus (USB) 274, an optical interface 276, and a D-subminiature (D-sub) 278. The interface 270 may be included in, for example, the communication interface 160 illustrated in FIG. 1. Additionally or alternatively, the interface 290 may include, for example, a Mobile High-definition Link (MHL) interface, a Secure Digital (SD) card/Multi-Media Card (MMC), or an Infrared Data Association (IrDA) standard interface.

The audio module 280 bi-directionally converts a sound and an electronic signal. At least some components of the audio module 280 may be included in, for example, the input/output interface 140 illustrated in FIG. 1. The audio module 280 processes sound information input or output through, for example, a speaker 282, a receiver 284, an earphone 286, the microphone 288 or the like.

The camera module 291 is a device which can photograph a still image and a video. According to an embodiment, the camera module 291 may include one or more image sensors (for example, a front sensor or a back sensor), an Image Signal Processor (ISP) (not shown) or a flash (for example, an LED or xenon lamp).

The power managing module 295 manages power of the electronic device 201. Although not illustrated, the power managing module 295 may include, for example, a Power Management Integrated Circuit (PMIC), a charger Integrated Circuit (IC), or a battery or fuel gauge.

The PMIC may be mounted to, for example, an integrated circuit or an SoC semiconductor. A charging method may be divided into wired and wireless methods. The charger IC charges a battery and prevent over voltage or over current from flowing from a charger. According to an embodiment, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier or the like may be added.

The battery fuel gauge measures, for example, a remaining quantity of the battery 296, or a voltage, a current, or a temperature during charging. The battery 296 may store or generate electricity and supply power to the electronic device 201 by using the stored or generated electricity. The battery 296 may include a rechargeable battery or a solar battery.

The indicator 297 shows particular statuses of the electronic device 201 or a part (for example, AP 210) of the electronic device 201, for example, a booting status, a message status, a charging status and the like. The motor 298 converts an electrical signal to a mechanical vibration.

Although not illustrated, the electronic device 201 may include a processing unit (for example, GPU) for supporting a module TV. The processing unit for supporting the mobile TV may process, for example, media data according to a standard of Digital Multimedia Broadcasting (DMB), Digital Video Broadcasting (DVB), media flow or the like.

Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single to entity, and thus may equivalently execute functions of the corresponding components before being combined.

Figure 3:
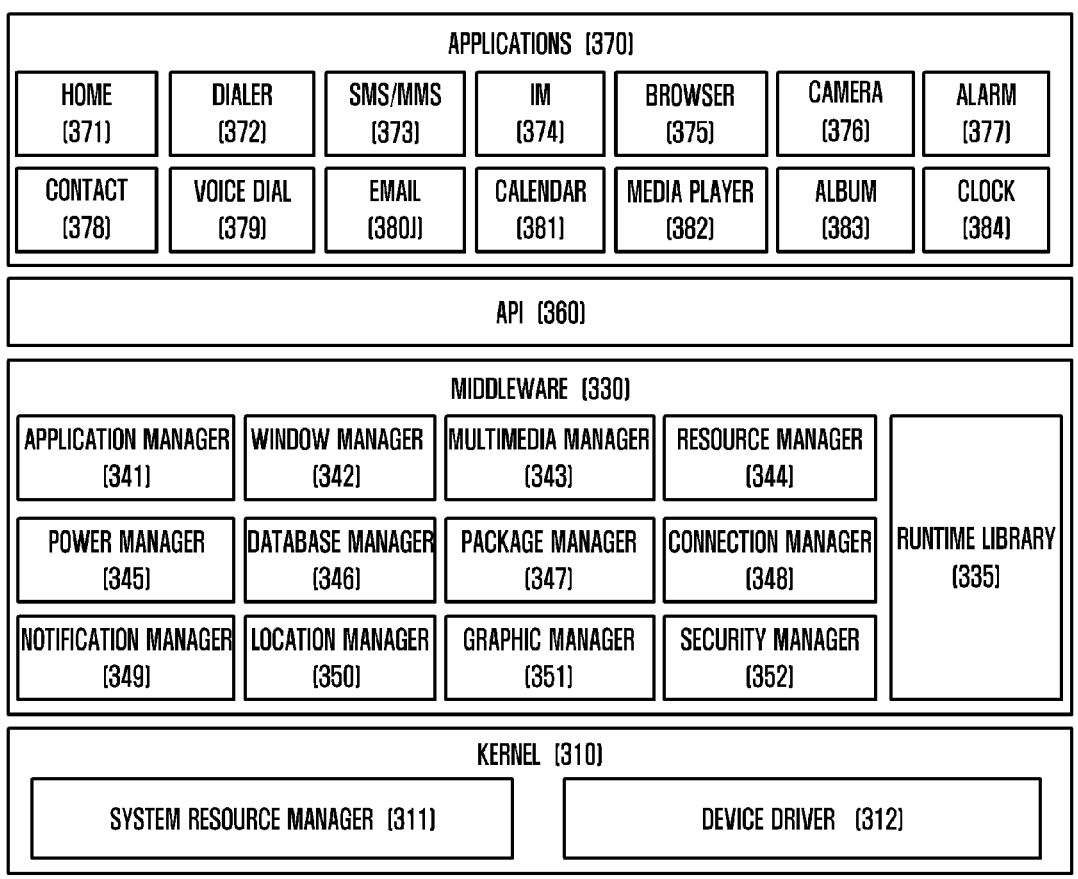
FIG. 3 is a block diagram of a programming module according to various embodiments of the present disclosure.

FIG. 3 is a block diagram of a programming module 300 according to an embodiment. The programming module 300 may be included (stored) in the electronic device 100 (for example, memory 130) illustrated in FIG. 1. At least some of the programming module 300 may be formed of software, firmware, hardware, or a combination of at least two of software, firmware, and hardware. The programming module 300 may be executed in the hardware (for example, electronic device 201) to include an Operating System (OS) controlling resources related to the electronic device (for example, electronic device 101) or various applications (for example, applications 370) driving on the OS. For example, the OS may be Android, iOS, Windows, Symbian, Tizen, Bada or the like. Referring to FIG. 3, the programming module 300 includes a kernel 310, a middleware 330, an Application Programming Interface (API) 360, and applications 370.

The kernel 310 (for example, kernel 131) includes a system resource manager 311 and a device driver 312. The system resource manager 311 may include, for example, a process manager, a memory manager, and a file system manager. The system resource manager 311 performs a system resource control, allocation, and recall. The device driver 312 may include, for example, a display driver, a camera driver, a Bluetooth driver, a shared memory driver, a USB driver, a keypad driver, a WiFi driver, and an audio driver. Further, according to an embodiment, the device driver 312 may include an Inter-Process Communication (IPC) driver.

The middleware 330 includes a plurality of modules prepared in advance to provide a function required in common by the applications 370. Further, the middleware 330 provides a function through the API 360 to allow the application 370 to efficiently use limited system resources within the electronic device. For example, as illustrated in FIG. 3, the middleware 300 (for example, middleware 132) includes at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 includes, for example, a library module used by a complier to add a new function through a programming language while the application 370 is executed. According to an embodiment, the runtime library 335 executes input and output, management of a memory, a function associated with an arithmetic function and the like.

The application manager 341 manages, for example, a life cycle of at least one of the applications 370. The window manager 342 manages GUI resources used on the screen. The multimedia manager 343 detects a format required for reproducing various media files and performs an encoding or a decoding of a media file by using a codec suitable for the corresponding format. The resource manager 344 manages resources such as a source code, a memory, or a storage space of at least one of the applications 370.

The power manager 345 operates together with a Basic Input/Output System (BIOS) to manage a battery or power and provides power information required for the operation. The database manager 346 manages generation, search, and change of a database to be used by at least one of the applications 370. The package manager 347 manages an installation or an update of an application distributed in a form of a package file.

The connection manager 348 manages, for example, a wireless connection such as WiFi or Bluetooth. The notification manager 349 displays or notifies a user of an event such as an arrival message, an appointment, a proximity alarm or the like, in a manner that does not disturb the user. The location manager 350 manages location information of the electronic device. The graphic manager 351 manages a graphic effect provided to the user or a user interface related to the graphic effect. The security manager 352 provides a general security function required for a system security or a user authentication. According to an embodiment, when the electronic device (for example, electronic device 101 or 201) has a call function, the middleware 330 may further include a telephony manager for managing a voice of the electronic device or a video call function.

The middleware 330 may generate a new middleware module through a combination of various functions of the aforementioned internal component modules and use the generated new middleware module. The middleware 330 may provide a module specified for each type of operating system to provide a differentiated function. Further, the middleware 330 may dynamically delete some of the conventional components or add new components. Accordingly, some of the components described in the embodiment of the present disclosure may be omitted, replaced with other components having different names but performing similar functions, or other components may be further included.

The API 360 (for example, API 133) is a set of API programming functions, and may be provided with a different configuration according to an operating system. For example, in Android or iOS, a single API set may be provided for each platform. In Tizen, two or more API sets may be provided.

The applications 370 (for example, application 134) may include, for example, a preloaded application or a third party application.

At least some of the programming module 300 may be implemented by a command stored in a computer-readable storage medium. When the command is executed by one or more processors (for example, processor 210), the one or more processors perform a function corresponding to the command. The computer-readable storage medium may be, for example, the memory 260. At least some of the programming module 300 may be implemented (for example, executed) by, for example, the processor 210. At least some of the programming module 300 may include, for example, a module, a program, a routine, sets of instructions, or a process for performing one or more functions.

Names of components of the programming module (for example, programming module 300) according to the present disclosure may vary depending on a type of operating system. Further, the programming module according to the present disclosure may include one or more of the aforementioned components, omit some of the components, or further include other additional components.

Figure 4:
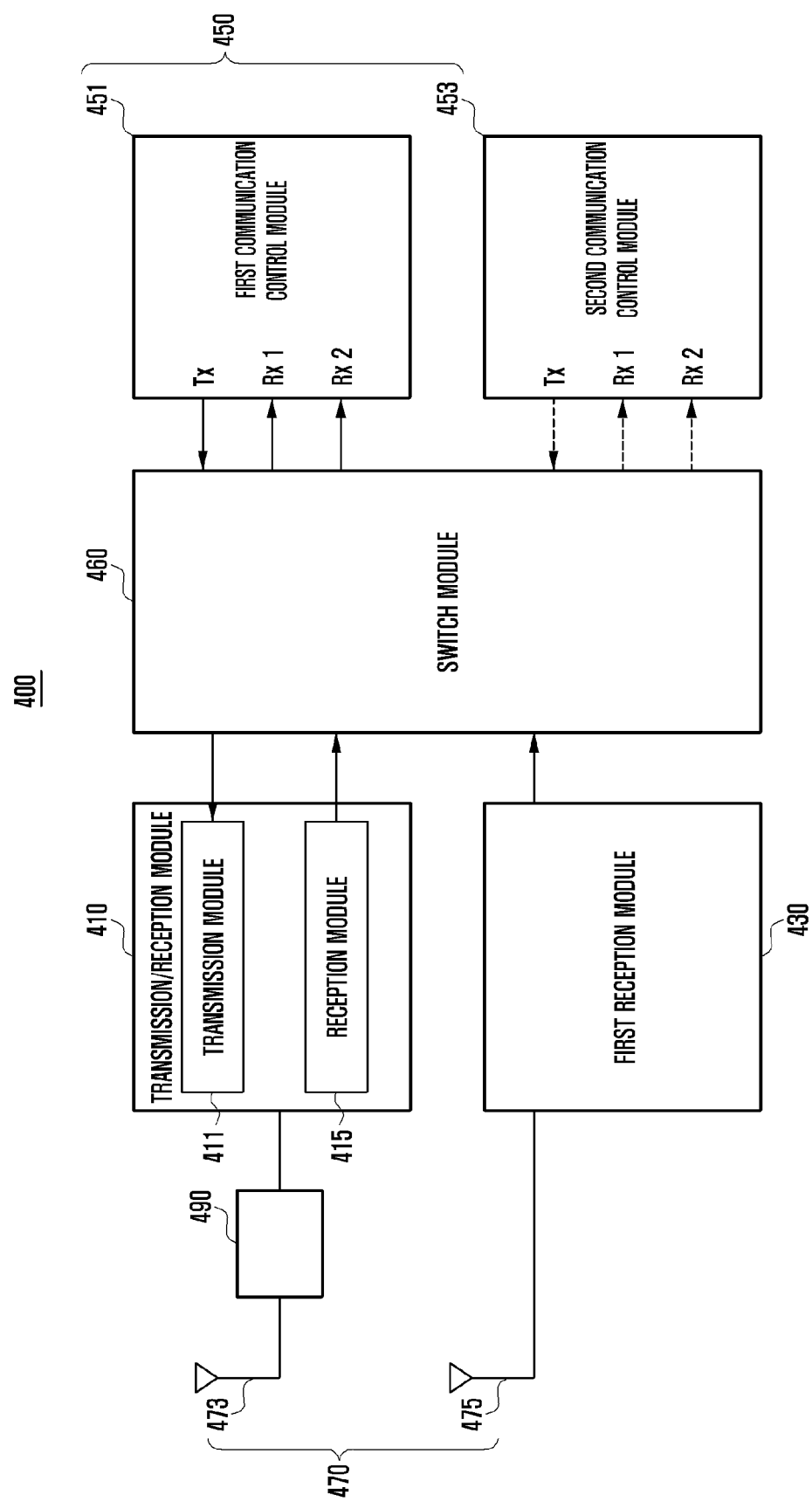
FIG. 4 is a block diagram of an electronic device according to various embodiments of the present disclosure.

Additional information related to a wireless communication method and apparatus for supporting a plurality of communication services according to various embodiments are described below in connection with FIGS. 4 to 12. FIG. 4 is a block diagram of an electronic device 400 (for example, electronic device 201) according to various embodiments of the present disclosure. As illustrated in FIG. 4, according to an embodiment, the electronic device 400 may include a transmission/reception module 410, a first reception module 430, a communication control module 450, a switch module 460, an antenna 470, and a duplexer 490.

The transmission/reception module 410 (for example, RF module 234) includes a transmission module 411 and a reception module 415. According to an embodiment, the transmission/reception module 410 may transmit or receive signals of a plurality of communication networks including at least a first communication network and a second communication network. For example, the transmission/reception module 410 transmits a signal to one of the first communication network and the second communication network through the transmission module 411 and receives a signal from one of the first communication network and the second communication network through the reception module 415. The first reception module 430 (for example, RF module 229) receives a signal from one of the first communication network and the second communication network.

According to various embodiments of the present disclosure, the first communication network may be a Circuit Switching (CS) network applying a transmission technology such as Code Division Multiple Access (CDMA) 1x, Wideband Code Division Multiple Access (WCDMA), Global System for Mobile communication (GSM), or the like. The second communication network may be a Packet Switching (PS) network using a transmission technology such as Long Term Evolution (LTE), mobile Wimax, or the like. A broadcast signal or a multicast signal may be received by the electronic device 400 through the PS network. The broadcast signal or the multicast signal of the PS network may be a signal to which an evolved Multimedia Broadcast Multicast Service (eMBMS) technology provided by 3GPP is applied. The broadcast signal or the multicast signal of the PS network (for example, a signal received through a Multicast CHannel (MCH) of LTE) and a data communication signal of the PS network (for example, a signal received through a DownLink-Shared CHannel (DL-SCH) of LIE) may have the same frequency band and are transmitted to the terminal (for example, electronic device 400) by a base station through a Time Division (TD) scheme. For example, the data communication signal of the PS network may be a data communication signal (for example, unicast) transmitted to a specified person and the broadcast signal of the PS network may be a broadcast signal transmitted to many unspecified people. The multicast signal of the PS network may be a multicast signal transmitted to many specified people.

Alternatively, the first communication network may be the PS network and the second communication network may be the CS network. Although the first communication network and the second communication network have been described as the CS network or the PS network (or converse thereof) for the convenience of description, the first communication network and the second communication network may be different communication networks using different transmission technologies according to various embodiments of the present disclosure.

The communication control module 450 (for example, communication processor 213) includes a first communication control module 451 and a second communication control module 453. The communication control module 450 controls one of the transmission/reception module 410 and the first reception module 430 to process at least one of signals of the first communication network and the second communication network. For example, the first communication control module 451 processes a signal of the first communication network (or a signal of the second communication network), and the second communication module 453 processes a signal of the second communication network (or a signal of the first communication network).

Each of the first communication control module 451 and the second communication control module 453 may include, for example, three ports including a transmitter e Tx, a first receiver Rx1, and a second receiver Rx2. According to an embodiment, the Tx is a port by which the first communication control module 451 or the second communication control module 453 transmits a signal to the transmission module 411. The Rx1 is a port by which the first communication control module 451 or the second communication control module 453 receives a signal from the reception module 415. The Rx2 is a port by which the first communication control module 451 or the second communication control module 453 receives a signal from the first reception module 430. According to an embodiment, the Rx1 may receive a signal from the first reception module 430 and the Rx2 may receive a signal from the reception module 415. Additional information on processing of the signal of the first communication network or the signal of the second communication network by the communication control module 450 will be described below with reference to FIGS. 5 to 7.

The switch module 460 may include one or more switches. For example, the switch module 460 may include three switches corresponding to the transmission module 411, the reception module 415, and the first reception module 430. The switch module 460 controls (for example, switches) to connect the transmission module 411, the reception module 415 or the first reception module 430 with the first communication control module 451 or the second communication control module 453 based on the signal processed by the transmission module 411, the reception module 415 or the first reception module 430.

According to an embodiment, when the first communication control module 451 transmits a signal corresponding to the first communication network to the first communication network, the switch module 460 connects the Tx of the first communication control module 451 with the transmission module 411. When the second communication control module 453 transmits a signal corresponding to the second communication network to the second communication network, the switch module 460 connects the Tx of the second communication control module 453 with the transmission module 411.

According to an embodiment, when the reception module 415 receives a signal corresponding to the first communication network, the switch module 460 connects the reception module 415 with the Rx1 of the first communication control module 451. When the reception module 415 receives a signal corresponding to the second communication network, the switch module 460 connects the reception module 415 with the Rx1 of the second communication control module 453. According to an embodiment, the switch module 460 may connect the first reception module 430 with the first communication control module 451 or the second communication control module 453 according to the signal received by the first reception module 430.

The antenna 470 includes a first antenna 473 and a second antenna 475. The first antenna 473 may be a transmission/reception antenna which simultaneously or sequentially transmits/receives at least one of the signal of the first communication network and the signal of the second communication network. The second antenna 475 may be a reception antenna which simultaneously or sequentially receives at least one of the signal of the first communication network and the signal of the second communication network.

The duplexer 490 connects the first antenna 473 and the transmission/reception module 410. The duplexer 490 prevents communication confusion by separating at least some of the signals transmitted by the transmission module 411 and received by the reception module 415. According to an embodiment, the duplexer 490 may be a dielectric duplexer or a SAW duplexer.

The first communication control module 451 and the second communication control module 453 may share at least one of the transmission/reception module 410, the first reception module 430, the switch module 460, the duplexer 490, the first antenna 473, and the second antenna 475. This allows the electronic device 400 to communicate with a plurality of communication networks (for example, the first communication network and the second communication network) through the use of a small number of components or modules. It is possible to make better use of a space of the electronic device 400 by reducing the number of components for a plurality of communication systems. For example, a space secured by a small number of components may be used for mounting the first antenna 473. A size of the first antenna 473 may be larger than a size of the antenna mounted to the user device having a plurality of transmission/reception modules for supporting a plurality of communication systems to increase a capability of the first antenna 473. The capability of the first antenna 473 may be identical or similar to a capability of the second antenna 475. For example, the receiving sensitivity of the first antenna 473 and the second antenna 475 may be identical to each other or have a difference within about 3 dB. In another embodiment, the receiving sensitivity of the first antenna 473 and the second antenna 475 may be identical to each other or have a difference within about 2 dB. In still another embodiment, the receiving sensitivity of the first antenna 473 and the second antenna 475 may be identical to each other or have a difference within about 1 dB.

Although FIG. 4 illustrates an example in which the first communication control module 451 and the second communication control module 453 are separate control modules (for example, modem) for the convenience of description, the first communication control module 451 and the second communication control module 453 may be configured as one communication control module supporting a plurality of (for example, two) communication systems (for example, a CS network communication system such as a CDMA1x system and a PS network communication system such as an LTE system) according to various embodiments.

Similarly, although it has been described that the first communication control module 451 and the second communication control module 453 include separate ports for the convenience of description, the first communication control module 451 and the second communication control module 453 may share at least some of the ports according to various embodiments. According to an embodiment, when the first communication control module 451 and the second communication control module 453 share at least some of the ports, the switch module 460 may be included in the communication control module 450. Additional information on a method in which the communication control module 450 processes the signal of the first communication network or the signal of the second communication network will be described below with reference to FIGS. 5 to 7.

Figure 5:
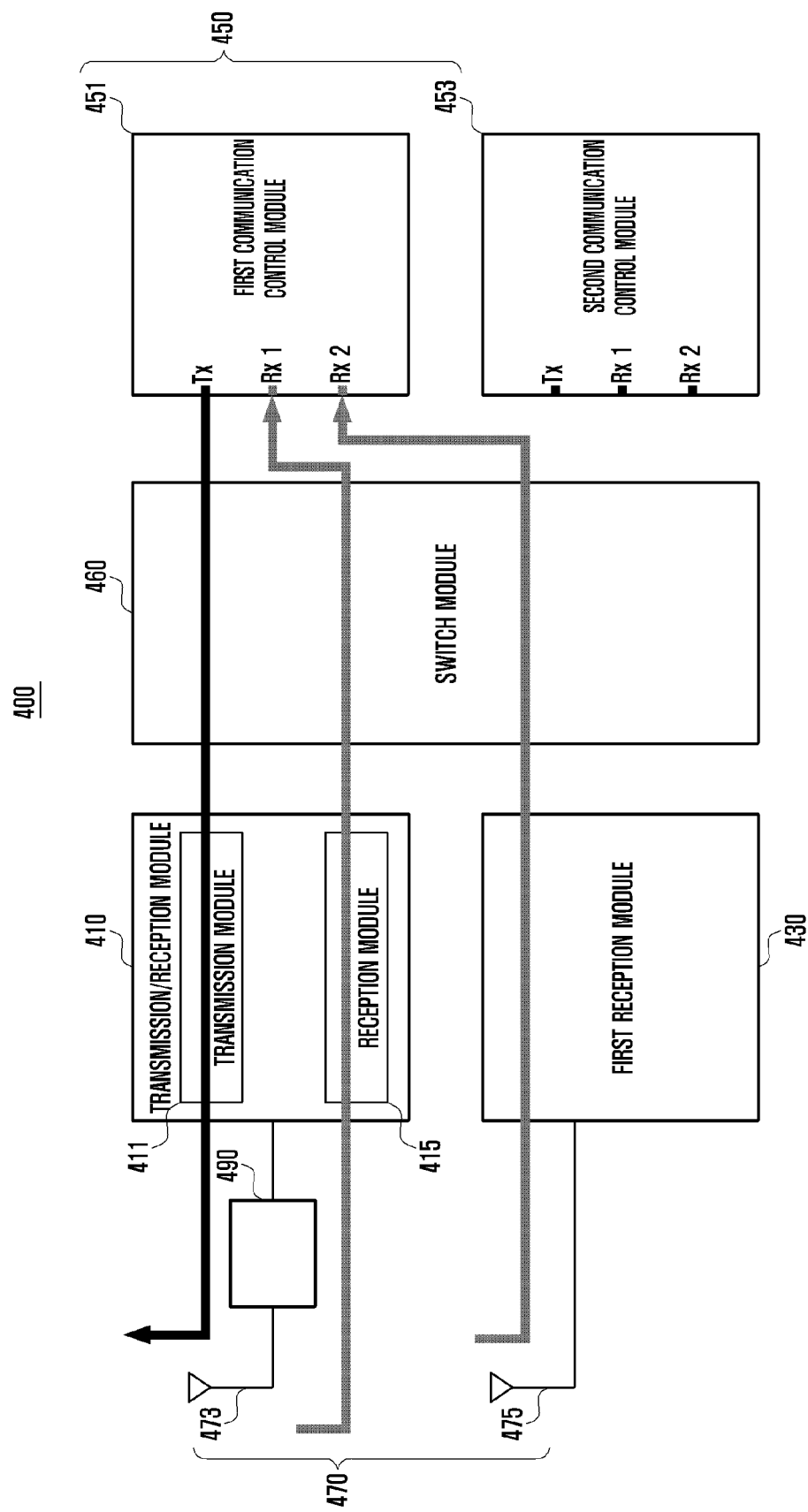
FIG. 5 illustrates a signal flow when an electronic device according to various embodiments of the present disclosure communicates with a first communication network.

FIG. 5 illustrates a signal flow when the electronic device (for example, electronic device 400) according to various embodiments of the present disclosure communicates with the first communication network (for example, the CS network). The electronic device 400 transmits and receives a signal of the first communication network. According to an embodiment, the first communication control module 451 controls the transmission/reception module 410 to transmit and receive the signal of the first communication network. For example, the first communication control module 451 is connected to the transmission module 411 through the switch module 460 to transmit a signal corresponding to the first communication network to the transmission module 411. Further, the signal transmitted to the transmission module 411 is transmitted to the first communication network through the duplexer 490 and the first antenna 473.

The first communication control module 451 is connected to the reception module 415 through the switch module 460 to receive a signal of the first communication network transmitted through the first antenna 473. In this event, for example, the first communication control module 451 receives the signal of the first communication network through the first receiver port (for example, Rx1). Further, the first communication control module 451 may control the first reception module 430 to receive the signal of the first communication network. The signal of the first communication network received by the first reception module 430 through the second antenna 475 may be received by the first communication control module 451. In this event, for example, the signal of the first communication network received by the first reception module 430 is transmitted to the second receiver port (for example, Rx2) of the first communication control module 451.

According to an embodiment, the first communication control module 451 may receive the signal of the first communication network through the reception module 415 and the first reception module 430. For example, the first communication control module 451 receives the signal of the first communication network by using both the first antenna 473 and the second antenna 475. This allows the first communication control module 451 to acquire a diversity gain of the signal of the first communication network. When the reception module 415 and the first reception module 430 receive the signal of the first communication network, the second communication control module 453 may be in, for example, an idle state or an Out Of Service (OOS) state.

When the electronic device 400 does not communicate with the first communication network (for example, CS network), such as when the user terminates a voice call, the communication control module 450 may transmit or receive the signal of the second communication network (for example, PS network) and process the signal.

Although not illustrated, according to an embodiment, when the communication control module 450 receives a paging signal of the second communication network (for example, PS network), the communication control module 450 may control the first reception module 430 to receive the paging signal of the second communication network. For example, the Rx1 or the Rx2 of the second communication control module 453 may be connected to the first reception module 430 through the switch module 460. In this event, the second communication control module 453 receives the paging signal of the second communication network received by the first reception module 430 through the second antenna 475. According to an embodiment, even when the electronic device 400 communicates with the first communication network, the first reception module 430 may receive the signal (for example, a broadcast signal or a paging signal) of the second communication network.

Figure 6:
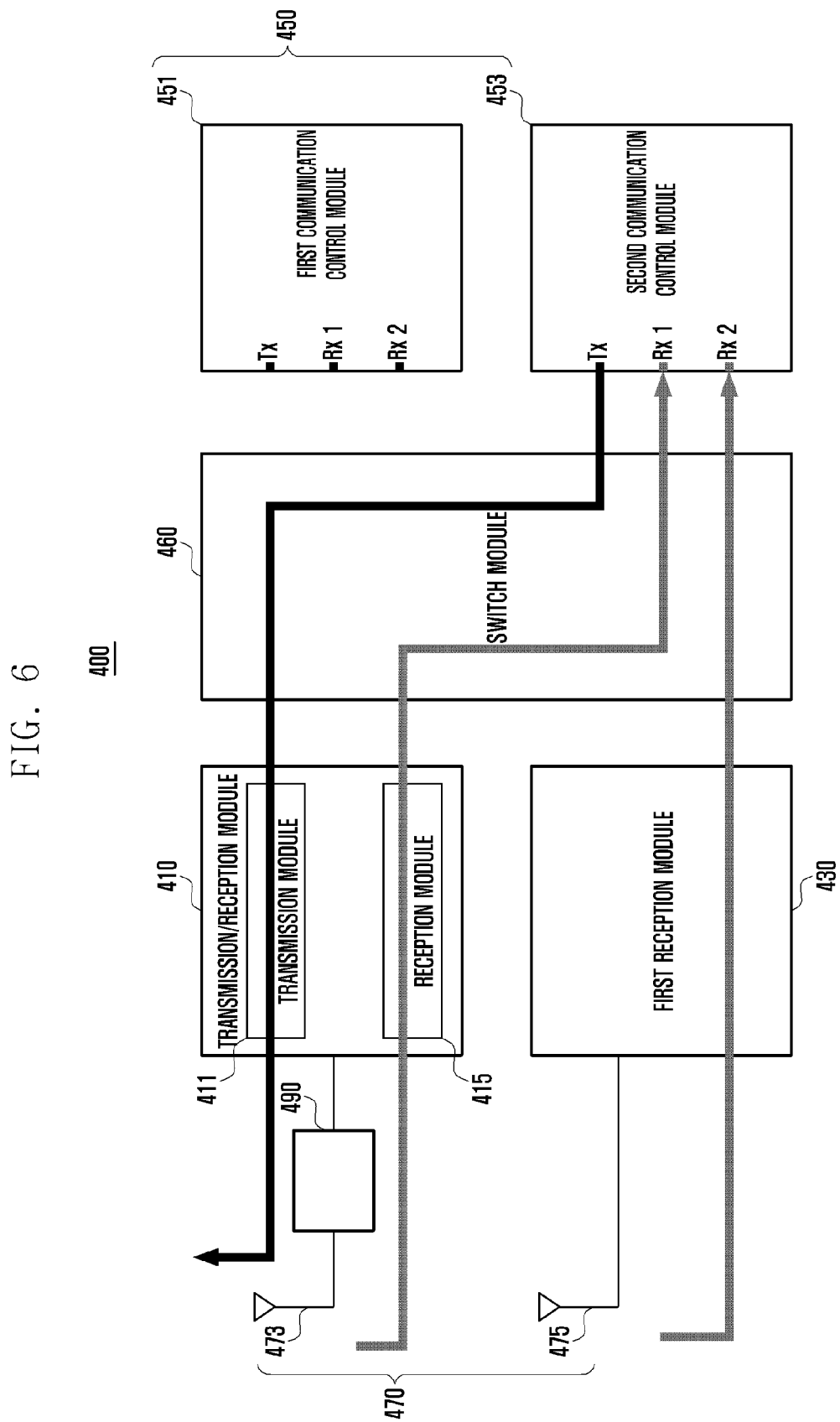
FIG. 6 illustrates a signal flow when an electronic device according to various embodiments of the present disclosure communicates with a second communication network.

FIG. 6 illustrates a signal flow when the electronic device (for example, electronic device 400) according to various embodiments of the present disclosure communicates with the second communication network (for example, the PS network). The electronic device 400 transmits and receives a signal of the second communication network. According to an embodiment, the second communication control module 453 controls the transmission/reception module 410 to transmit and receive the signal of the second communication network. For example, the second communication control module 453 is connected to the transmission module 411 through the switch module 460 to transmit a signal corresponding to the second communication network to the transmission module 411. The signal transmitted to the transmission module 411 is transmitted to the second communication network through the duplexer 490 and the first antenna 473.

The second communication control module 453 is connected to the reception module 415 through the switch module 460 to receive a signal of the second communication network (for example, the signal of the PS network) transmitted through the first antenna 473. The signal of the PS network may include at least one of a data communication signal (for example, unicast) transmitted to a specified person and a broadcast signal (for example, a signal received through a Broadcast CHannel (BCH) of LTE) transmitted to many unspecified people. Further, the signal of the PS network may include a multicast signal transmitted to many designated people. For example, the second communication control module 453 receives the signal of the second communication network through the first receiver port (for example, Rx1). The second communication control module 453 controls the first reception module 430 to receive the signal of the second communication network. The signal of the second communication network received by the first reception module 430 through the second antenna 475 may be received by the second communication control module 453. In this event, the signal of the second communication network received by the first reception module 430 is transmitted to the second receiver port (for example, Rx2) of the second communication control module 453.

According to an embodiment, the second communication control module 453 receives the signal of the second communication network through the reception module 415 and the first reception module 430. For example, the second communication control module 453 receives the signal of the second communication network by using both the first antenna 473 and the second antenna 475. This allows the second communication control module 453 to perform, for example, Multiple Input Multiple Output (MIMO) required for the signal of the second communication network (for example, the PS network). When the reception module 415 and the first reception module 430 receive the signal of the second communication network, the first communication control module 451 may be in, for example, an idle state. Additional information on a method in which the communication control module 450 controls the first reception module 430 to receive a paging signal of the first communication network will be described below with reference to FIG. 7.

Figure 7:
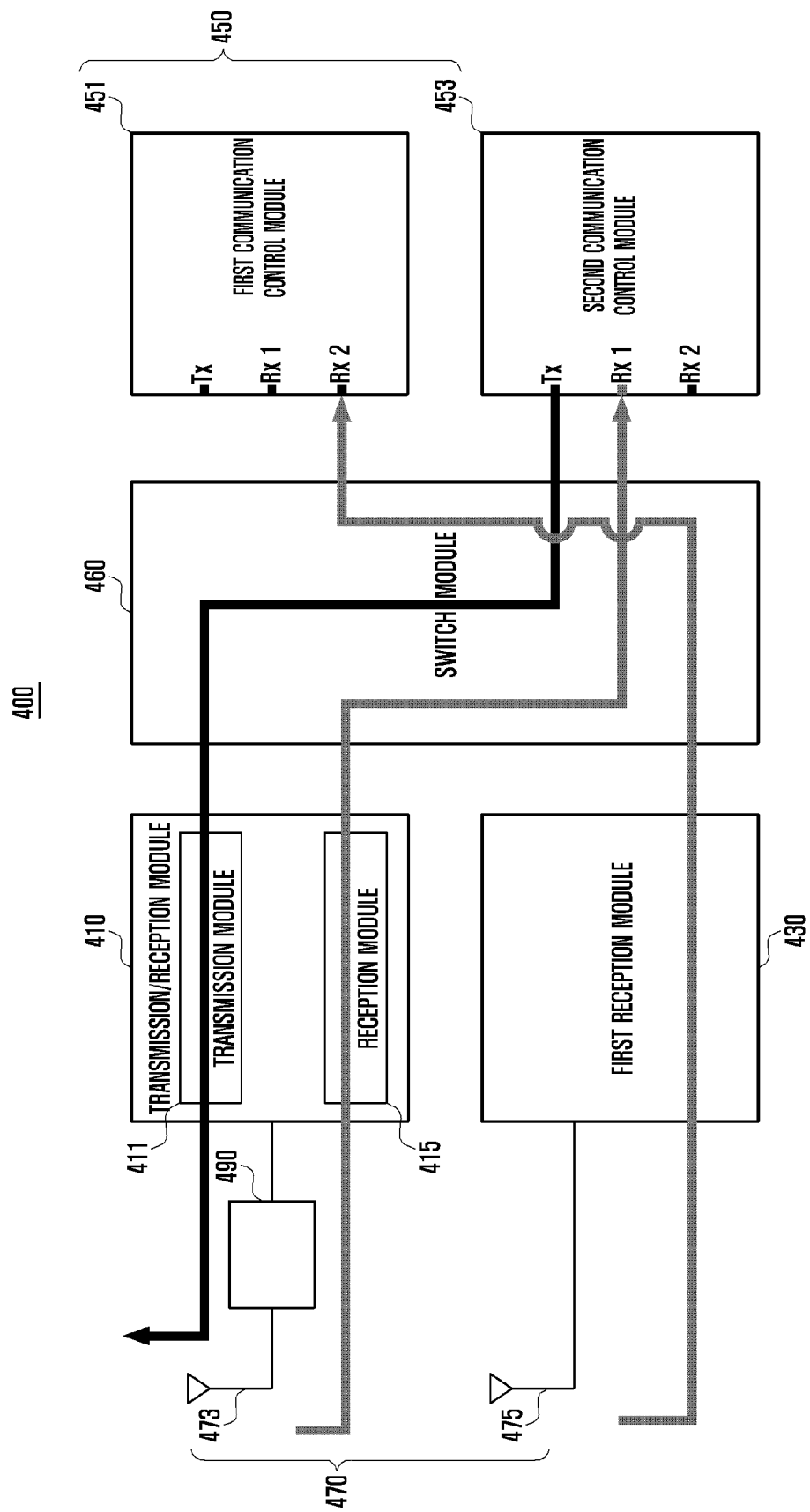
FIG. 7 illustrates a signal flow when an electronic device according to various embodiments of the present disclosure receives a paging signal of a first communication network.

FIG. 7 illustrates a signal flow when the electronic device (for example, electronic device 400) according to various embodiments of the present disclosure receives the paging signal of the first communication network (for example, the CS network). The electronic device 400 may communicate with, for example, the second communication network. For example, the communication control module 450 controls the transmission/reception module 410 to transmit and receive the signal of the second communication network. Since a description thereof is identical or similar to the description of FIG. 6, the description will be omitted.

When the communication control module 450 desires to receive a paging signal of the first communication network (for example, the CS network), the communication control module 450 controls the first reception module 430 to receive the paging signal of the first communication network. For example, the first communication control module 451 is connected to the first reception module 430 through the switch module 460. Further, the first communication control module 451 receives the paging signal of the first communication network received by the first reception module 430 through the second antenna 475. Further, the first communication control module 451 may receive the paging signal of the first communication network received by the first reception module 415 through the first antenna 473.

According to an embodiment, the electronic device 400 monitors a state of a signal of at least one of the first communication network and the second communication network received through at least one of the first antenna 473 and the second antenna 475 periodically or aperiodically. For example, the electronic device 400 monitors a state of a signal (for example, a paging signal, a pilot channel signal, a broadcast control channel signal, a command pilot channel signal, or the like) of the first communication network (for example, the CS network) through at least one of the first antenna 473 and the second antenna 475.

According to an embodiment, the electronic device 400 obtains a state of a signal (for example, an electric field) based on a paging signal of the first communication network or the second communication network received through at least one of the first antenna 473 and the second antenna 475. For example, the electronic device 400 may receive the paging signal of the first communication network about every 2.56 seconds. When the electronic device 400 receives the paging signal of the first communication network, the electronic device 400 determines a state (for example, a signal intensity or a communication quality) of the signal for the first communication network. For example, the electronic device 400 may identify the state of the signal of the first communication network when the paging signal is received as well as before or after the paging signal of the first communication network is received. According to an embodiment, the electronic device 400 may identify the state of the signal of the first communication network based on at least two of various signals of the first communication network.

According to an embodiment, the electronic device 400 selects an antenna for receiving a paging signal of the first communication network or the second communication network from the first antenna 473 and the second antenna 475 based on a state (for example, the signal intensity) of the signal of the first communication network and the second communication network. For example, according to the design of the antenna, a signal reception capability of the first antenna 473 may be higher than a signal reception capability of the second antenna 475 by, for example, about 2 dB. In this case, the electronic device 400 may selectively change the antenna for receiving the paging signal of the first communication network (or the second communication network) from the first antenna 473 to the second antenna 475 or from the second antenna 475 to the first antenna 475 by considering both the state of the signal of the first communication network (or the second communication network) and the antenna reception capability.

For example, when an intensity of the signal of the first communication network obtained through at least one of the first antenna 473 and the second antenna 475 (for example, the first antenna 473 having a relatively larger signal reception capability) is within a first designated range (for example, the intensity is strong enough to provide a service provided through the first communication network or a communication quality corresponds to "fair" among "good", "fair", and "poor"), the electronic device 400 may receive the paging signal of the first communication network through the second antenna 475 having a relatively smaller signal reception capability. For example, when the intensity of the signal of the first communication network is within the first designated range even though the electronic device 400 receives the current paging signal of the first communication network through the first antenna 473 having the larger signal reception capability, the electronic device 400 may change an antenna for receiving a next paging signal of the first communication network from the first antenna 473 to the second antenna 475. Further, in this case, the electronic device 400 may receive the signal of the second communication network (for example, a data signal of the second communication network) through the first antenna 473 having the relatively larger signal reception capability. Accordingly, the electronic device 400 may provide a data service by receiving the signal of the second communication network with a signal intensity stronger than the intensity of the signal of the first communication network.

According to an embodiment, when an intensity of the signal of the first communication network obtained through at least one of the first antenna 473 and the second antenna 475 (for example, the first antenna 473 having a relatively larger signal reception capability) is within a second designated range (for example, the intensity is not strong enough to provide a service provided through the first communication network or a communication quality corresponds to "poor" among "good", "fair", and "poor"), the electronic device 400 may receive the paging signal of the first communication network through the first antenna 473. For example, when the intensity of the signal of the first communication network is within the second designated range even though the electronic device 400 receives the current paging signal of the first communication network through the second antenna 475 having the smaller signal reception capability, the electronic device 400 may change an antenna for receiving a next paging signal of the first communication network from the second antenna 475 to the first antenna 473.

According to an embodiment, when the paging signal (for example, a paging signal received through a paging channel in CDMA) of the first communication network (for example, the CS network) and the paging signal (for example, a paging signal transmitted by a mobile mobility entity of LTE) of the second communication network (for example, the PS network) overlap each other, the communication control module 450 may give a priority to the paging signal of the first communication network. Accordingly, even though the user uses a packet service through the second communication network, the user may use a voice call performed through the first communication network. When the first reception module 430 receives the paging signal of the first communication network, additional information on a method in which the communication control module 450 processes the signal of the second communication network will be described below with reference to FIG. 9, 13 or 14. According to an embodiment, when a service (for example, a VoIP service) having a high priority is provided through the second communication network, if the signal of the first communication network (for example, a signal for receiving an SMS/MMS) and the signal of the second communication network (for example, a paging signal for VoLTE reception) overlap each other, the communication control module 450 may give a priority to the signal of the second communication network.

Hereinafter, an electronic device 800 according to various embodiments of the present disclosure will be described with reference to FIG. 8. Parts of the electronic device 800 of FIG. 8 identical or similar to the electronic device 400 described in FIG. 4 will be omitted. FIG. 8 is a block diagram of an electronic device 800 (for example, electronic device 201) according to various embodiments of the present disclosure. According to an embodiment, the electronic device 800 includes a first transmission/reception module 810, a second transmission/reception module 830, a communication control module 850, a switch module 860, an antenna 870, and a duplexer 890. The first transmission/reception module 810 includes a first transmission module 811 and a first reception module 815, and the second transmission/reception module 830 includes a second transmission module 831 and a second reception module 835. The communication control module 850 includes a first communication control module 851 and a second communication control module 853. The antenna 870 includes a first antenna 873 and a second antenna 875, and the duplexer 890 includes a first duplexer 891 and a second duplexer 895.

According to an embodiment, the first communication control module 851 and the second communication control module 853 may share the first reception module 815 and the second reception module 835. The first transmission module 811 may be identical or similar to the transmission module 411, and the first reception module 815 may be identical or similar to the reception module 415. The second transmission/reception module (for example, RF module 229) transmits a signal to, for example, the first communication network or the second communication network and receives a signal of the first communication network or the second communication network.

The communication control module 850 controls the first transmission/reception module 810 or the second transmission/reception module 830 to process at least one of the signal of the first communication network and the signal of the second communication network. According to an embodiment, the first communication control module 851 and the second communication control module 853 may share, for example, the first reception module 815 or the second reception module 835 to simultaneously or sequentially process the signal of the first communication network or the signal of the second communication network. Additional information on processing of the signal of the first communication network or the signal of the second communication network by the communication control module 850 will be described below with reference to Table 1.

According to an embodiment, the switch module 860 includes a plurality of switches. For example, the switch module 860 may include two switches corresponding to the first reception module 815 and the second reception module 835. Further, the switch module 860 may control (for example, switch) to connect the first reception module 815 or the second reception module 835 with the first communication control module 851 or the second communication control module 853 based on the first reception module 815 or the second reception module 835.

Since the first antenna 873 and the second antenna 875 are identical or similar to the first antenna 473 of the electronic device 400, a description thereof will be omitted. The first duplexer 891 connects the first antenna 873 and the first transmission/reception module 810. The second duplexer 895 connects the second antenna 875 and the second transmission/reception module 830.

The first communication control module 851 is connected to the first transmission module 811 in FIG. 8 for the convenience of description, and the second communication control module 853 may be connected to the second transmission module 831. According to an embodiment, the first communication control module 851 and the second communication control module 853 may share the first transmission module 811 and the second transmission module 831. For example, when the signal is transmitted to the second communication network (for example, the PS network) and a MIMO implementation is required, for example, when an uplink MIMO is required, the second communication control module 853 may be connected to the first transmission control module 811 and the second transmission control module 831.

Alternatively, according to an embodiment, the first communication control module 851 may be connected to the first transmission module 811 and the second transmission module 831. According to an embodiment, when the first communication control module 851 and the second communication control module 853 share at least one of the first transmission module 811 or the second transmission module 831, an internal circuit included in the switch module 860 may be changed to another internal circuit. Further, the first communication control module 851 and the second communication control module 853 may further include at least one transmitter for sharing the first transmission module 811 or the second transmission module 831.

Hereinafter, signal processing of the first communication control module 851 or the second communication control module 853 will be described with reference to Table 1. In Table 1, the electronic device 800 is expressed as having first to fourth states according to whether the electronic device 800 is connected to the first communication network or the second communication network. The first communication network may be, for example, the CS network, and CDMA1x is shown as one example of the CS network in Table 1. The second communication network may be, for example, the PS network, and LTE is shown as one example of the PS network in Table 1. Other examples of the CS network and the PS network have been described above.

TABLE 1

| State | First communication network (example: CDMA1x) | Second communication network (example: LTE) |
|---|---|---|
| 1 | idle | idle |
| 2 | connected | idle |
| 3 | idle | connected |
| 4 | connected | connected |

An "idle" state may refer to, for example, a state where there is no radio connection between the electronic device 800 and the communication network (for example, first communication network or the second communication network). In the "idle" state, the electronic device 800 may monitor a paging signal of the first communication network or the second communication network.

A "connected" state may refer to, for example, a state where the electronic device 800 and the communication network have a radio connection therebetween and thus can exchange a signal. In the "connected" state, the electronic device 800 may exchange, for example, a control message with the communication network and transmit/receive user data. For example, in the "connected" state, the electronic device 800 may perform at least one of a data service, a voice call, base station registration (for example, LTE attach or CDMA1x registration) or operation(s) informing the base station of the communication network according to a condition when the electronic device 800 moves.

In the first state of Table 1, both the first communication control module 851 (for example, the CDMA1x system) and the second communication control module 853 (for example, the LTE system) may be in the idle state. In the first state, the first communication control module 851 and the second communication control module 853 monitor a paging signal by using at least one of the first reception module 815 and the second reception module 835.

According to an embodiment, the first communication control module 851 may be connected to one of the first reception module 815 and the second reception module 835 to receive a paging signal of the first communication network (for example, CDMA1x). According to an embodiment, the second communication control module 853 may be connected to the other of the first reception module 815 and the second reception module 835 to receive a paging signal of the second communication network (for example, LTE). Since different communication systems use different paging periods, each of the communication systems (for example, first communication control module 851 and second communication control module 853) may receive the paging signal by using an independent reception path (for example, Rx path). Further, each of the communication systems may control on/off of each reception path.

According to an embodiment, each of the first communication control module 851 and the second communication control module 853 may monitor the paging signal or receive a signal by using both the first reception module 815 and the second reception module 835. For example, since the first communication control module 851 has a priority over the second communication control module 853, the first communication control module 853 may use the first reception module 815 as a first reception path and the second reception module 835 as a second reception path to receive the signal of the first communication network. The first communication control module 851 may also have a priority over the reception path (for example, second reception path) allocated to the second communication control module 853. In this event, only when the first communication control module 851 does not use the reception path allocated to the second communication control module 853, the second communication control module 853 may use the allocated reception path, as the reception path is allocated to the second communication control module 853. According to another embodiment, when the second communication control module 853 has a priority over the first communication control module 851, the second communication control module 853 may use the first reception module 815 as a first reception path and the second reception module 835 as a second reception path to receive the signal of the second communication network. For example, the second communication control module 853 may also have a priority over the reception path (for example, first reception path) allocated to the first communication control module 851.

According to an embodiment, when the first communication control module 851 the CDMA1x system) desires to acquire a diversity gain by using a plurality of reception modules (for example, first reception module 815 and second reception module 835), the first communication control module 851 may use both of the two reception modules to utilize two reception paths. For example, when a signal intensity of the CDMA1x signal is weak (for example, when the signal is weaker than a predetermined dB value or when a BER value larger than a predetermined BER value is acquired), the first communication control module 851 may use both reception paths corresponding to the two reception modules. According to another embodiment, when the second communication control module 853 the LTE system) desires to acquire a diversity gain by using a plurality of reception modules, the second communication control module 853 may use both of the two reception modules to utilize two reception paths.

Further, when a reception intensity of the paging signal of the first communication network is low (for example, when the first communication control module 851 cannot detect the paging signal of the first communication network), the first communication control module 851 may receive the paging signal by using both reception paths. For example, when the intensity of the paging signal of CDMA1x is less than or equal to a threshold, the first communication control module 851 may use both reception modules. When the intensity of the paging signal of CDMA1x is sufficiently large, for example, when the intensity is greater than a threshold, the first communication control module 851 may use one of the two reception modules. For example, when the intensity of the paging signal of CDMA1x is sufficiently large, the first communication control module 851 receives an LTE signal through the first reception path and receives the paging signal of CDMA1x through the second reception path. Alternatively, when the intensity of the signal of CDMA1x received through the first reception path is sufficiently large and the intensity of the signal of CDMA1x received through the second reception path is not sufficiently large, the first communication control module 851 receives the paging signal of CDMA1x through the first reception path. Further, when the user blocks the LTE communication for another reason, the first communication control module 851 may use both reception modules. The first communication control module 851 may dynamically use the two reception modules according to various reasons (for example, CDMA1x signal intensity, diversity demand, paging signal, LTE network block, etc.).

When the first communication control module 851 uses the two reception modules, the signal of the second communication network (for example, data service through the LTE network) may not be processed in real time. Since the data reception of the LTE network may have a lower priority in comparison with signal reception of CDMA1x and the necessity of real time processing is relatively low, the user may not feel a big inconvenience. For example, even though an email server transmits a paging signal informing the user of an arrival of an email to the electronic device 800, the electronic device 800 may not receive the paging signal. In this event, confirmation of the arrival of the email is somewhat delayed, but it may not be an issue to the user.

According to an embodiment, when the second communication network supports a service having a high priority (for example, a voice service), the second communication control module 853 may have a priority and receive the signal of the second communication network by using at least one of the first reception module and the second reception module. When the second communication control module 853 uses both reception modules, the signal of the first communication network may be processed.

In the first state of Table 1, both the first communication control module 851 (for example, the CDMA1x system) and first communication network (for example, the CDMA1x network) may be in the "connected" state, and the second communication control module 853 (for example, the LTE system) may be in the "idle" state. In the second state, the electronic device 800 communicates with the first communication network for example, the user may perform a voice call. The first communication control module 851 may communicate with the first communication network by using one of the two reception paths (for example, a first reception path) and one of the two transmission paths (for example, a first transmission path corresponding to the first transmission module 811 or second transmission path corresponding to the second transmission module 831). The second communication control module 853 may receive the paging signal of the second communication network by using the other of the two reception paths.

In the second state also, based on various reasons, the first communication control module 851 may have a priority over the second communication control module 853. For example, the first communication control module 851 may use both reception modules based on the priority. In this event, the second communication control module 853 cannot receive the paging signal of the second communication network or may use one reception path only when the second communication control module 853 receives the paging signal of the second communication network. In the second state, the second communication control module 853 may have a priority over the first communication control module 851. For example, when a service having a high priority (for example, a voice service or VoIP) is provided through the second communication control module 853, the second communication control module 853 may use at least one of the two reception paths based on the priority. In this event, the first communication control module 851 cannot receive the signal of the first communication network or may receive the signal of the first communication network by using the reception path which the second communication control module 853 does not use.

In the third state of Table 1, the first communication control module 851 (for example, the CDMA1x system) may be in the "idle" state, and the second communication control module 853 (for example, the LTE system) and the second communication network (for example, the LTE network) may be in the "connected" state. In the third state, the electronic device 800 may be in a state where communication with the second communication network is possible, for example, a case where the user uses a data service. The second communication control module 853 may communicate with the second communication network by using one or the two reception paths (for example, second reception path) and one of the two transmission paths (for example, second transmission path).

The first communication control module 851 may receive the paging signal of the first communication network the CDMA1x network) by using the other of the two reception paths (for example, first reception path). When intensities of the signals (for example, the signal of the first communication network or the signal of the second communication network) received through the two reception paths are sufficiently large, the first communication control module 851 receives the paging signal of the first communication network by using one of the two reception paths. For example, when the intensities (for example, electric field or communication quality) of the signals received through the two reception paths are sufficiently large, the first communication control module 851 receives the paging signal through a reception path (such as the second reception path) having a relatively lower signal intensity between the two reception paths. According to an embodiment, the signal reception capability of the first antenna 873 may be the same as the signal reception capability of the second antenna 875 or may be higher by about 3 dB. When an intensity of the received signal (the electric field) is large enough to provide the service, the electronic device 800 receives the paging signal of the first communication network through a reception path the second reception path) including the second antenna 875. Further, in this case, the electronic device 800 provides the data service by receiving the signal of the second communication network through a reception path the first reception path) including the first antenna 873. Accordingly, the electronic device 800 may receive the signal of the second communication network corresponding to the data service with a stronger intensity in the third state. That is, when the intensity of the signal of the first communication network received through only one of the two reception paths is sufficiently large, the first communication module 851 may receive the paging signal through the one reception path.

According to an embodiment, when the paging signal of the first communication network is received, the first communication control module 851 may use both the first reception path and the second reception path. For example, a priority of the paging signal of the first communication network (the CDMA1x network) may be higher than the priorities of other signals. Accordingly, when the paging signal of the first communication network is received, the first communication control module 851 may dynamically use the two reception paths based on the various reasons. In another embodiment, a priority of the paging signal of the second communication network (the LTE network) may be higher than priorities of other signals. Accordingly, during communication with the second communication network, the paging signal of the first communication network may not be received or may be restrictively received. For example, when the second communication network does not communicate or when an operation is made in a Rank1 mode of the second communication network, the paging signal of the first communication network may be received.

According to an embodiment, the second communication control module 853 may implement transmission/reception of the signal of the second communication network in a MIMO scheme. When the paging signal of the first communication network is received, one of the two reception paths is used for receiving the paging signal of the first communication network. When the second communication control module 853 receives the signal of the first communication network (for example, the paging signal of the first communication network), the second communication control module 853 may change a reception mode of the signal of the second communication network. For example, the second communication control module 853 may change a processing mode of the signal received from the second communication network. When the signal of the first communication network is received, additional information on a method in which the second communication control module 853 receives the signal of the second communication network will be described below in connection with FIG. 9, 13, or 14.

In the fourth state of Table 1, the first communication control module 851 (the CDMA1x system) may be in a connection state with the first communication network (the CDMA1x network) and the second communication control module 853 (the LTE system) may be in a connection state with the second communication network (the LTE network). For example, the user may receive a voice call while using a data service or use the data service while performing the voice call, such that the user may use the data service such as web surfing while performing the voice call at the same time. In this event, the electronic device 800 may be switched to the fourth state from the second state or from the third state.

In the fourth state, the first communication control module 851 or the second communication control module 853 may not use the two reception paths. This is because continuously allocating one reception path to the first communication control module 851 in the CS system may be advantageous to the first communication control module 851 in continuing a connection with the CS network. Also, this is because the second communication control module 853 corresponds to, for example, the PS system and thus receives a Physical Downlink Control CHannel (PDCCH) in every Transmission Time Interval (TTI) when the second communication control module 853 does not operate in a connected DRX (Discontinuous Reception) mode. According to an embodiment, when the second communication control module 853 operates in the connected DRX mode, the first communication control module 851 may use the reception path allocated to the second communication control module 853 during an interval where the second communication control module 853 does not receive the signal of the second communication network. Accordingly, the second communication control module 853 may acquire a diversity gain.

Referring back to FIG. 4, a difference between the electronic device 400 of FIG. 4 and the electronic device 800 of FIG. 8 is that the electronic device 400 includes, for example, one transmission module. Accordingly, the electronic device 400 supports the first to third states. Since a voice call has a higher priority than a data service, if the electronic device 400 receives a voice call during the data service, the electronic device 400 may stop the data service and perform the voice call. According to an embodiment, the user may configure priorities of the voice call through the CS network and the data service (for example, data communication or voice call through the PS network) through a user interface. Further, the electronic device (for example, electronic device 400) may have a different service and operating system for each condition according to a service provider's requirement.

Additional information on a state of the second communication network (for example, LTE) will be described with reference to Table 2.

TABLE 2

| | Second communication ntework (example: LTE) | |
|---|---|---|
| Type state | PS network data communication signal (example: DL-SCH signal) | PS network broadcast signal or multicast signal (example: BCH or MCH signal) |
| 1 | Idle | Not received |
| 2 | Connected | Not received |
| 3 | Idle | Received |
| 4 | Connected | Received |

In a first state of Table 2, the LTE system (for example, communication control module 450) of the electronic device 400 may be in the "idle" state where a data communication signal of the PS network is not transmitting and receiving. Further, the electronic device 400 may be in a state where a broadcast signal or a multicast signal of the PS network is not received. In the first state, the communication control module 450 monitors the paging signal of the first communication network (for example, CS network) by using at least one of the reception module 415 and the first reception module 430.

In a second state of Table 2, the communication control module 450 may be in the "connected" state where a data communication signal (for example, a signal corresponding to a voice call or data) of the PS network can be transmitted and received and the broadcast signal or the multicast signal of the PS network is not received. In the second state, the communication control module 450 monitors the paging signal of the CS network by using at least one of the reception module 415 and the first reception module 430.

In a third state of Table 2 the communication control module 540 may be in the "idle" state where the data communication signal of the PS network is not transmitted and received and the broadcast signal or the multicast signal of the PS network can be received. For example, the third state may be a state where there is no transmission/reception of the data communication signal of the PS network but the broadcast signal or the multicast signal (for example, eMBMS) of the PS network can be received. In the third state, the communication control module 450 monitors the paging signal of the CS network by using at least one of the reception module 415 and the first reception module 430. According to an embodiment, the communication control module 450 may receive the broadcast signal or the multicast signal of the PS network by controlling at least one of the transmission/reception module 410 and the first reception module 430 in the third state. Further, the communication control module 450 may periodically monitor the paging signal of the CS network by controlling the first reception module 430.

In a fourth state of Table 2, the communication control module 450 may be in the "connected" state where the data communication signal of the PS network can be received and the broadcast signal or the multicast signal of the PS network can be received. For example, the fourth state may be a state where the data communication signal of the PS network can be transmitted and received and the broadcast signal or the multicast signal (for example, eMBMS) of the PS network can be received. In the fourth state, the communication control module 450 monitors the paging signal of the CS network by using at least one of the reception module 415 and the first reception module 430. According to an embodiment, in the fourth state, the communication control module 450 receives at least one of the data communication signal, the broadcast signal, and the multicast signal of the PS network by controlling the reception module 415 and transmits the data communication signal of the PS network by controlling the transmission module 411. Further, the communication control module 450 receives at least one of the data communication signal, the broadcast signal and the multicast signal of the PS network. In addition, the communication control module 450 may periodically monitor the paging signal of the CS network by controlling the first reception module 430.

Figure 9:
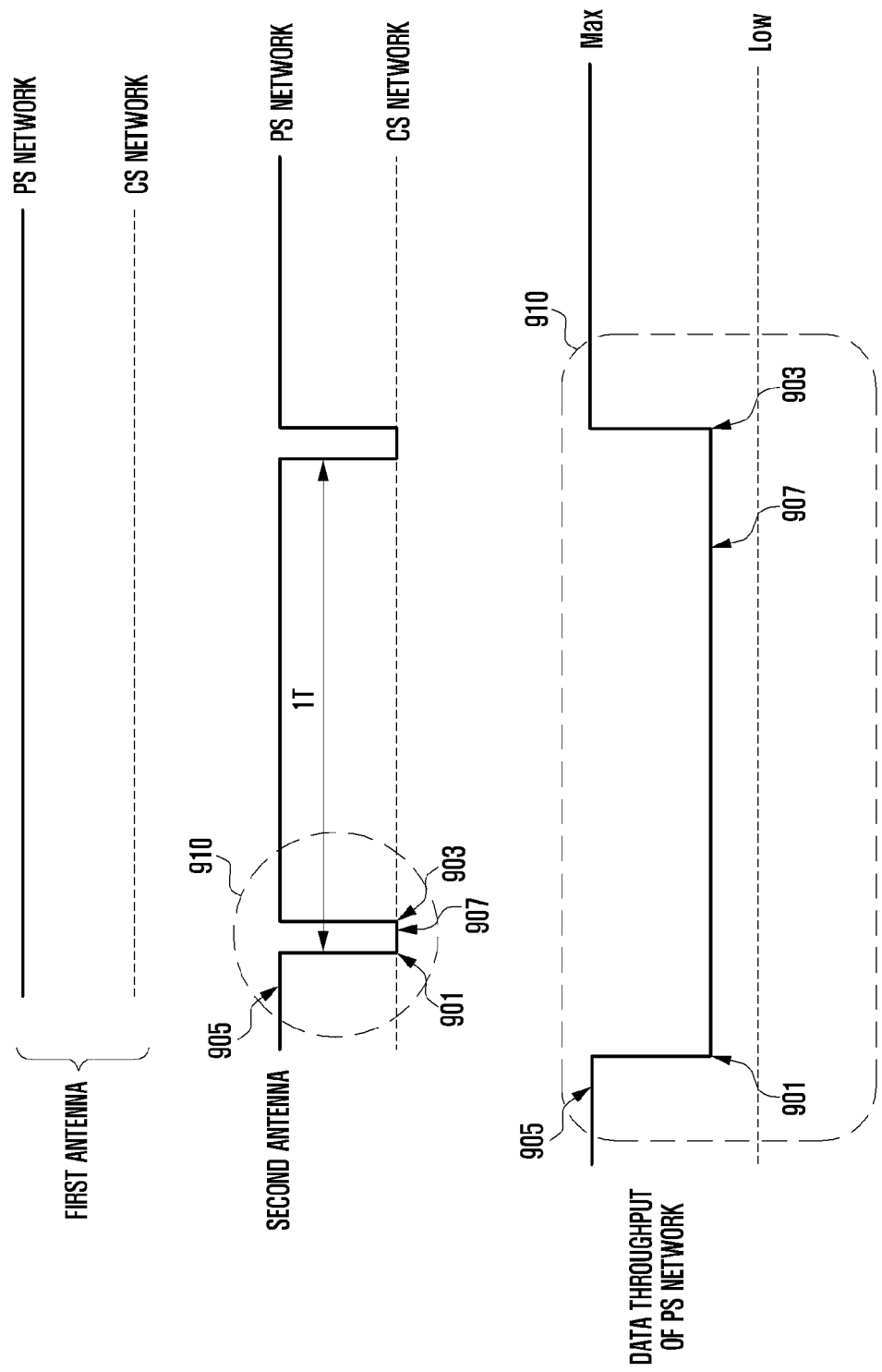
FIG. 9 illustrates, when a paging signal of one communication network is received, data throughput of another communication network according to various embodiments of the present disclosure.

Hereinafter, when the second communication control module (for example, second communication control module 453 or 853) uses one of the first reception path and the second reception path, a signal processing method will be described with reference to FIG. 9. FIG. 9 is a timing chart illustrating data throughput of the signal of the second communication network (for example, the PS network) when the paging signal of the first communication network (for example, the CS network) is received. In FIG. 9, a solid line refers to a signal of the communication network which the second communication control module 453 or 853 currently receives and a dotted line refers to a signal which the second communication control module 453 or 853 does not currently receive but will be able to receive.

According to an embodiment, the second communication control module 453 or 853 may receive the signal of the PS network through the first antenna 473 or 873. Further, the second communication control module 453 or 853 may receive the signal of the PS network through the second antenna 475 or 875 and receive a paging signal of the CS network according to, for example, one period of 1 T. For example, the second antenna 475 or 875 may switch the signal currently received in a first time point 901 to the paging signal of the CS network from the signal of the PS network and switch the signal currently received in a second time point 903 to the signal of the PS network from the paging signal of the CS network. Although not illustrated, according to an embodiment, when the second antenna 475 or 875 receives the paging signal of the CS network, the first communication control module 451 or 851 may transmit a first feedback to the second communication control module 453 or 853 prior to reception of the paging signal of the CS network. A timing of receiving the paging signal of the CS network may be determined according to a series of procedures defined by the standard of the first communication network, and the first communication control module 451 or 851 may know a reception time point of the paging signal of the CS network. Accordingly, the first communication control module 451 or 851 may transmit first feedback to the second communication control module 453 or 853 in advance.

The second communication control module 453 or 853 having received the first feedback from the first communication control module 451 or 851 may provide second feedback (for example, transmit related information to a rank indicator through a Physical Uplink Control CHannel (PUCCH) of the LTE standard or through a data channel) to the PS. A time point when the second feedback is transmitted to the PS network may be, for example, a third time point 905 ahead of the first time point 901 when the second antenna 475 or 875 receives the paging signal of the CS network. The PS network having received the second feedback switches a data transmission mode from a Rank2 mode to a Rank1 mode (for example, diversity mode), so that the second communication control module 453 or 853 may receive data which has not been lost while the first communication control module 451 or 851 receives the signal of the CS network (for example, from the first time point 901 to the second time point 903).

Although not illustrated, according to an embodiment, the first communication control module 451 or 851 may transmit the first feedback to the second communication control module 453 or 853 before the second time point 903 when the reception of the paging signal of the CS network ends. Further, the second communication control module 453 or 853 having received the first feedback may transmit the second feedback to the PS network. For example, the second communication control module 453 or 853 may provide the second feedback to the PS network in a fourth time point 907 before the second time point 903. Accordingly, the PS network may transmit data to, for example, an interval where reception of the paging signal of the CS network ends in the Rank2 mode. Then, the second communication control module 453 or 853 may receive PS network data which has not been lost to have data throughput of the PS network having a Max value.

A timing chart in FIG. 9 shows that the data throughput of the PS network provides an enlargement of the data throughput of the PS network in a marked part 910 of the second antenna 475 or 875. The data throughput of the PS network may become the Max when the second antenna 475 or 875 receives the signal of the PS network (for example, third time point 905). This is because the second communication control module 453 or 853 operates, for example, in the Rank2 mode to receive the signal of the PS network by using both the first antenna 473 or 873 and the second antenna 475 or 875. The second communication control module 453 or 853 provides the feedback to the PS network in the third time point 905 but the second antenna 475 or 875 can still receive the signal of the PS network. The PS network having already received the feedback in the third time point 905 may transmit the signal of the PS network in the Rank1 mode in order to allow the first antenna 473 or 873 to correctly receive data in the first time point 901 where the second antenna 475 or 875 receives the paging signal of the CS network. Accordingly, the data throughput of the PS network does not become the Max in the first time point 901 but becomes a value higher than a Low value because data has not been lost. Similarly, the second communication control module 453 or 853 transmits the signal of the PS network in the Rank2 mode in a time point (for example, second time point 903) when the reception of the paging signal of the CS network ends, so that data throughput of the PS network may become the Max from the third time point 903.

Although FIG. 9 illustrates that the second communication control module 453 or 853 is implemented by a Multi Input Multi Output (MIMO) scheme for the convenience of description, the second communication control module 453 or 853 may have various embodiments. For example, the second communication control module 453 or 853 may be implemented in a Spatial Multiplexing MIMO (SM MIMO) mode or a Space-Frequency Block Code (SFBC) mode to process the signal of the second communication network. The SM MIMO mode may be divided into, for example, the Rank2 mode where different pieces of data are received through a plurality of antennas or the Rank1 mode where the same data is received through a plurality of antennas. According to various embodiments, when the second communication control module 453 or 853 uses two antennas and operates in the Rank1 mode or the SFBC mode, a setting of the second communication control module 453 or 853 may be controlled according to an implementation mode of the second communication control module 453 or 853. For example, when the second communication control module 453 or 853 operates in the SFBC mode or the SM MIMO Rank1 mode, deterioration of the reception capability of the signal of the PS network can be improved by controlling the second communication control module 453 or 853 while the paging signal of the CS network is received. Further, a region where the electronic device 400 or 800 can operate in the SM MIMO Rank2 mode is limited to proximity of a base station of the second communication network. Accordingly, even when the paging signal of the CS network is received, the reception capability of the signal of the PS network is not significantly affected.

According to an embodiment, a base station of the CS network may transmit feedback of a time point when the paging signal of the CS network is received to a base station of the PS network. In this event, the base station of the PS network may switch a transmission mode in accordance with the time point when the paging signal of the CS network is received. For example, when the electronic device 400 or 800 receives the paging signal of the CS network, the PS network may transmit the signal of the PS network in the Rank1 mode. Further, the PS network may transmit the signal of the PS network in the Rank2 mode in a time point when the reception of the paging signal of the CS network by the electronic device 400 or 800 ends. In this event, the electronic device 400 or 800 may not provide the feedback of the time point when the PS network receives the paging signal of the CS network and switches a reception mode of the signal of the PS network based on whether the paging signal of the CS network is received.

Figure 10:
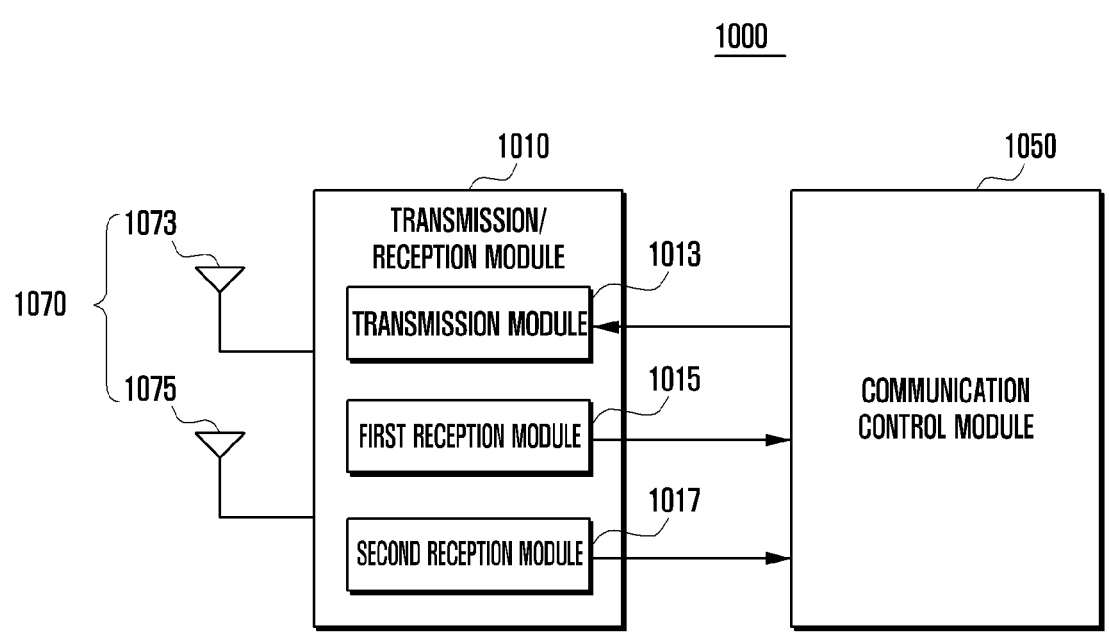
FIG. 10 is a block diagram of an electronic device according to various embodiments of the present disclosure.

Hereinafter, an electronic device 1000 according to various embodiments of the present disclosure will be described with reference to FIG. 10. A description of parts of the electronic device 1000 identical or similar to the electronic device 400 will be omitted. FIG. 10 is a block diagram of the electronic device 1000 (for example, electronic device 201 of FIG. 2) according to various embodiments. The electronic device 1000 includes a transmission/reception module 1010, a communication control module 1050, and an antenna 1070. According to an embodiment, the transmission/reception module 1010 includes a transmission module 1013, a first reception module 1015, and a second reception module 1017, and the antenna 1070 includes a first antenna 1073 and a second antenna 1075.

According to an embodiment, when the signal of the PS network is received through at least one of the first reception module 1015 and the second reception module 1017, at least one of the first reception module 1015 and the second reception module 1017 may at least temporarily receive the signal of the CS network in preference to the signal of the PS network. For example, the communication control module 1050 may control the transmission/reception module 1010 such that the electronic device 1000 receives the paging signal of the CS network according to a period of the paging signal of the CS network while communicating with the PS network.

According to an embodiment, when the signal of the CS network is received through at least one of the first reception module 1015 and the second reception module 1017, at least one of the first reception module 1015 and the second reception module 1017 determines whether to receive the signal from the PS network based on a reception intensity of the signal received from the CS network. For example, when the signal intensity of the CS network corresponds to a first range (for example, a service of the CS network can be used even though one antenna is used), the communication control module 1050 controls such that one of the first reception module 1015 and the second reception module 1017 receives the signal of the PS network. Further, for example, the communication control module 1050 may control such that a reception module having a relatively weak signal intensity of the CS network between the first reception module 1015 and the second reception module 1017 receives the signal of the PS network.

For example, the control module 1050 may control such that the signal of the CS network is received through a reception module having a relatively stronger electric field intensity (for example, signal intensity) of the CS network between the first reception module 1015 and the second reception module 1017, and the signal of the PS network is received through a reception module having a relatively weaker electric field intensity. Alternatively, when the signal intensity of the CS network received by the first reception module 1015 and the second reception module 1017 corresponds to a second range (for example, the service of the CS network cannot be stably used when one antenna is used), the communication control module 1015 may not receive the signal of the PS network. The first range or the second range may be configured based on, for example, a threshold of the signal intensity and may be variously configured according to a state of the electronic device, a setting by the user, a region where the electronic device is located, an intensity of the communication network, and the like.

According to an embodiment, the communication control module 1050 controls such that at least one of the first reception module 1015 and the second reception module 1017 determines whether to receive the signal from the PS network based on the paging signal of the CS network or the PS network. For example, even when the signal of the CS network has priority over the signal of the PS network, if the paging signal of the PS network is received, the signal of the PS network may have priority over the signal of the CS network (for example, a priority of the signal of the PS network is higher than a priority of the signal of the CS network). Further, the communication control module 1050 may control such that the priorities become equal whenever the paging signal is received or the priorities become different according to a number of times that the paging signal cannot be received. For example, when the paging signal of the PS network is received at a predetermined interval (for example, 3.5 seconds), the first paging signal may not be received since the CS network has priority. Then, when a second paging signal is received, a priority of the PS network may become higher than the priority of the CS network.

Further, when the signal intensity of the CS network is less than or equal to, for example, a reference value, a priority of the signal of the CS network may be higher than a priority of the paging signal of the PS network. For example, even when the first paging signal of the PS network is not received and the second paging signal of the PS network is received, if the signal intensity of the CS network is less than or equal to the reference value, the priority of the signal of the CS network may be higher than the priority of the signal of the PS network. Further, according to an embodiment, when the paging signal of the CS network and the signal of the PS network overlap (for example, all or some intervals overlap), the communication control module 1050 may assign a higher priority to the paging signal of the CS network over the paging signal of the PS network. Assigning the priority to the paging signal of the CS network reduces inconvenience felt by the user since the user may be more sensitive to the signal of the CS rather than the signal of the PS network.

According to an embodiment, the priority may be assigned to the paging signal of the PS network based on a service provided through the PS network. For example, when the PS network provides a voice service and the CS network provides another service (for example, SMS), the paging signal of the PS network may have a higher priority in comparison with the signal of the CS network. Alternatively, when the voice service of the PS network has a higher priority in comparison with the voice service of the CS network, the paging signal of the PS network may have a higher priority in comparison with the signal of the CS network.

According to an embodiment, when the signal received by at least one of the first reception module 1015 or the second reception module 1017 is changed, the communication control module 1050 may provide feedback to the first communication network or the second communication network. For example, when the signal received by the first reception module 1015 or the second reception module 1017 is switched from the signal received from the PS network to the signal received from the CS network or from the signal received from the CS network to the signal received from the PS network, the communication control module 1050 may provide feedback to the CS network or the PS network. According to an embodiment, when the paging signal of the CS network or the paging signal of the PS network is received, the reception module implemented by the MIMO between the first reception module 1015 or the second reception module 1017 receives the signal of the PS network while switching a MIMO mode from a first reception mode (for example, Rank1 mode) to a second reception module (for example, Rank2 mode).

According to an embodiment, when the communication control module 1050 requires the switching of the reception mode of the signal of the PS network (for example, switching from the Rank1 mode to the Rank2 mode or from the Rank2 mode to the Rank1 mode), the feedback may be provided to the PS network in a time point of the switching of the reception mode. For example, when at least one of the first reception module 1015 and the second reception module 1017 receives the paging signal of the CS network, the communication control module 1050 provides the feedback to the PS network before the paging signal of the CS network is received. According to an embodiment, although not illustrated, the communication control module 1050 may include a first modem (for example, the first communication control module 451 or 851) for processing the signal of the CS network or a second modem (for example, the second communication control module 453 or 853) for processing the signal of the PS network. Further, when the paging signal is received from the CS network, the first modem may provide feedback of the reception of the paging signal to the second modem. According to an embodiment, although not illustrated, the transmission/reception module 1010 may further include a third reception module or a fourth reception module when the PS network provides a data service through CA (Carrier Aggregation). For example, the first reception module 1015 or the third reception module may receive a Primary cell (Pcell) signal or the signal of the CS network, and the second reception module 1017 or the fourth reception module may receive a Secondary cell (Scell) signal or the signal of the CS network. when the signal of the PS network (for example, Pcell and Scell signals) is received through at least one of the first to fourth reception modules, at least one of the first to fourth reception modules may at least temporarily receive the signal received from the CS network in preference to the signal received from the PS network.

Figure 11:
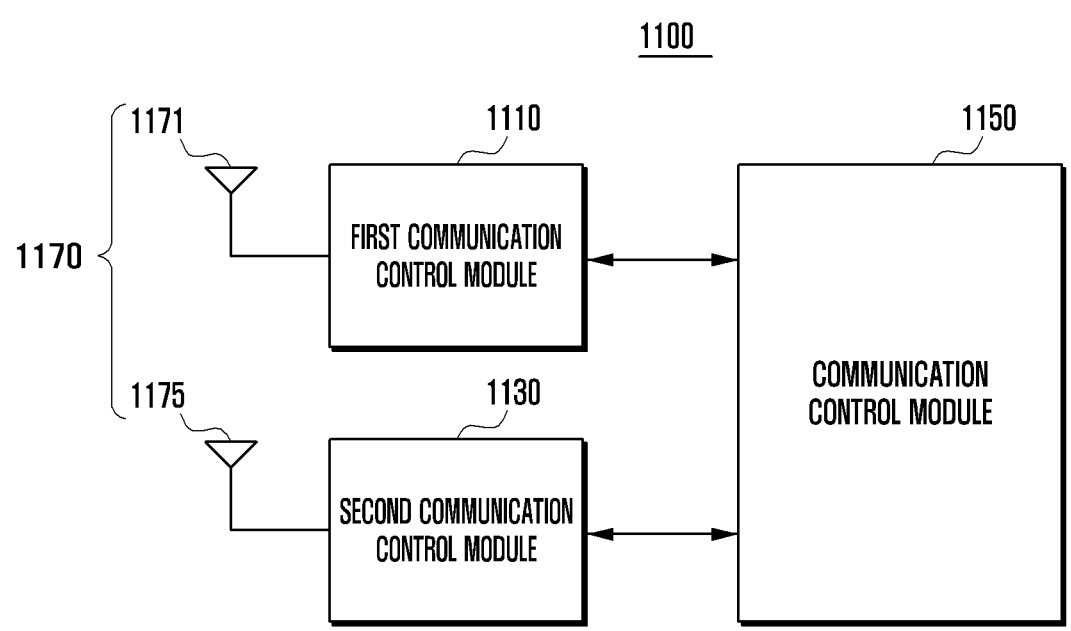
FIG. 11 is a block diagram of an electronic device according to various embodiments of the present disclosure.

Hereinafter, an electronic device 1100 according to various embodiments of the present disclosure will be described with reference to FIG. 11. Descriptions of parts of the electronic device 1100 identical or similar to the electronic device 1000 will be omitted. FIG. 11 is a block diagram of the electronic device 1100 (for example, electronic device 201) according to various embodiments. The electronic device 1100 includes a first communication module 1110, a second communication module 1130, a communication control module 1150, and an antenna 1170. The antenna 1170 may include a first antenna 1173 and a second antenna 1175.

According to an embodiment, when at least one of the first communication module 1110 and the second communication module 1130 transmits a signal to the first communication network, at least one of the first communication module 1110 and the second communication module 1130 may at least temporarily receive a signal of the second communication network. Further, at least one of the first communication module 1110 and the second communication module 1130 may transmit a signal to the communication network corresponding to the signal which is being received by the first communication module 1110 or the second communication module 1130. For example, when the first communication module 1110 receives a signal from the first communication network, the first communication module 1110 transmits a signal to the first communication network.

According to an embodiment, when the signal received by the first communication module 1110 or the second communication module 1130 is changed, the communication control module 1150 may provide feedback to the first communication network or the second communication network. For example, when at least one of the first communication module 1110 and the second communication module 1130 receives the signal of the second communication network and then receives the signal of the first network, the communication control module 1150 provides feedback to the second communication network.

According to an embodiment, at least one of the first communication module 1110 and the second communication module 1130 may select the signal of the second communication network in preference to the signal of the first communication network based on a reception intensity of the signal of the first communication network, or based on at least one of the signal of the first communication network and the paging signal of the second communication network. For example, even though the priority of the first communication network is higher than the priority of the second communication network, the priority of the second communication network may become higher than the priority of the first communication network when the paging signal of the second communication network is received.

According to various embodiments, the electronic device includes the transmission module for transmitting the signal of the Circuit Switching (CS) network or the signal of the Packet Switching (PS) network, the first reception module and the second reception module for receiving the signal from the CS network or the PS network, and the communication control module for controlling the transmission module and the first and second reception modules. When the signal of the PS network is received through at least one of the first reception module and the second reception module, the communication control module may at least temporarily receive the signal received from the CS network in preference to the signal received from the PS network through at least one of the first reception module and the second reception module.

According to various embodiments, the communication control module receives the signal from the PS network through the first reception module and at least temporarily receives the signal from the CS network through the second reception module.

According to various embodiments, when the intensity of the signal received from the CS network through the second reception module is within a designated range or the signal is not received, the communication control module at least temporarily receives an additional signal from the CS network through the first reception module.

According to various embodiments, when the signal of the CS network is received through at least one of the first reception module and the second reception module, the communication control module may at least temporarily receive the signal received from the PS network through at least one of the first reception module and the second reception module in preference to the signal received from the CS network.

According to various embodiments, when the signal of the CS network is received through at least one of the first reception module and the second reception module, the communication control module may receive the signal from the CS network through the first reception module and may at least temporarily receive the signal from the PS network through the second reception module.

According to various embodiments, when the signal of the CS network is received through at least one of the first reception module and the second reception module, the communication control module may determine whether to receive the signal from the PS network through at least one of the first reception module and the second reception module based on a reception intensity of the signal received from the CS network.

According to various embodiments, the communication control module may receive an additional signal from the CS network through at least one of the first reception module and the second reception module based on the signal of the CS network received through at least one of the first reception module and the second reception module.

According to various embodiments, when the intensity of the signal of the CS network received through the first reception module and the second reception module is within a designated range, the communication control module may receive an additional signal from the CS network through a reception module having a smaller signal intensity between the first reception module and the second reception module.

According to various embodiments, the communication control module may determine whether to at least temporarily receive the signal from the PS network through at least one of the first reception module and the second reception module based on at least one of the paging signals received from the CS network and the PS network.

According to various embodiments, when the paging signals received from the CS network and the PS network overlap, the communication control module may receive the paging signal of the CS network in preference to the paging signal of the PS network through at least one of the first reception module and the second reception module.

According to various embodiments, when the signal received by the first reception module or the second reception module is switched from the signal received from the PS network to the signal received from the CS network or from the signal received from the CS network to the signal received from the PS network, the communication control module may provide feedback to the CS network or the PS network.

According to various embodiments, at least one of the first reception module and the second reception module is implemented by the MIMO scheme and may receive the signal from the PS network in one of the first reception mode and the second reception mode based on the paging signal received from the CS network.

According to various embodiments, when at least one of the first reception module and the second reception module receives the paging signal of the CS network, the communication control module may provide the feedback to the PS network before the paging signal of the CS network is received.

According to various embodiments, the communication control module may include the first modem for processing the signal received from the CS network or the second modem for processing the signal received from the PS network.

According to various embodiments, when the paging signal is received from the CS network, the first modem may provide feedback of the reception of the paging signal to the second modem.

According to various embodiments, the electronic device may further include the first antenna for transmitting and receiving the signal of the CS network or the signal of the PS network and the second antenna for receiving the signal of the CS network or the signal of the PS network.

According to various embodiments, the first antenna and the second antenna may have the same receiving sensitivity or a difference of the receiving sensitivities may be within 3 dB.

According to various embodiments, when the intensity of the signal of the CS network received through one of the first antenna and the second antenna is within a designated range, the communication control module may receive an additional signal of the CS network through the other one of the first antenna and the second antenna.

According to various embodiments, the electronic device may further include the third reception module and the fourth reception module for receiving the signal from the CS network or the PS network. The communication control module may receive a first signal from the PS network through at least one of the first reception module and the second reception module and receive a second signal from the PS network through at least one of the third reception module and the fourth reception module.

According to various embodiments, the first signal and the second signal may include different pieces of information related to the PS network. For example, the first signal and the second signal may include information corresponding to a signal received through a frequency of a first band (for example, 1800 MHz band) and information corresponding to a signal received through a frequency of a second band (for example, 850 MHz band). In a system supporting CA, the first signal and the second signal may include different pieces of information corresponding to a signal received through the Pcell and a signal received through the Scell. Alternatively, the first signal and the second signal may include information corresponding to a plurality of signals received through a MIMO channel. For example, the first signal and the second signal may include different pieces of information corresponding to a signal received through a first MIMO channel and a signal received through a second MIMO channel. In this event, the first reception module and the second reception module may receive the first signal through a diversity reception method and the third reception module and the fourth reception module may receive the second signal through a diversity reception method.

According to various embodiments, the communication control module may receive the signal from the CS network through one of the third reception module and the fourth reception module when the second signal is not received through at least one of the third reception module and the fourth reception module.

According to various embodiments, the communication control module may receive the signal from the CS network through at least one of the first, second, third, and fourth reception modules based on at least one of quality of the first signal and quality of the second signal.

According to various embodiments, the electronic device may further include at least one transmission module for transmitting the signal to the CS network or the PS network.

According to various embodiments, the communication control module may receive at least one of a unicast signal, a broadcast signal, and a multicast signal, through at least one of the first reception module and the second reception, as the signal of the PS network.

According to various embodiments, when the signal of the CS network is received through one of the first reception module and the second reception module, the communication control module may receive at least one of the broadcasting signal and the multicast signal of the PS network through the other one of the first reception module and the second reception module.

According to various embodiments, when the communication control module receives at least one of the broadcast signal and the multicast signal of the PS network through the first reception module and the second reception module and then receives the signal of the CS network through one of the first reception module and the second reception module, the communication control module may maintain reception of at least one of the broadcast signal and the multicast signal of the PS network through the other one of the first reception module and the second reception module.

According to various embodiments, the communication control module may receive the signal of the CS network in an interval where the broadcast signal is not received through at least one of the first reception module and the second reception module.

According to various embodiments, when the communication control module receives the unicast signal and the broadcast signal or the multicast signal of the PS network through the first reception module and the second reception module and then receives the signal of the CS network through one of the first reception module and the second reception module, the communication control module may stop receiving the unicast signal of the PS network through the other one of the first reception module and the second reception module and maintain the reception of the broadcast signal or the multicast signal of the PS network.

According to various embodiments, the electronic device includes the first communication module and the second communication module for transmitting and receiving the first signal of the first communication network or the second signal of the second communication network and the communication control module for controlling the first and second communication modules. When the signal is transmitted to the first communication network through at least one of the first communication module and the second communication module, the communication control module may at least temporarily receive the signal of the second communication network through at least one of the first communication module and the second communication module.

According to various embodiments, the communication control module may transmit the signal to the communication network corresponding to the signal received by the first communication module or the second communication module through at least one of the first communication module and the second communication module.

According to various embodiments, when the signal received by the first communication module or the second communication module is switched from one of the signal of the first communication network and the signal of the second communication network to the other signal, the communication control module may provide feedback to the first communication network or the second communication network.

According to various embodiments, the communication control module may select the signal of the second communication network in preference to the signal of the first communication network through at least one of the first communication module and the second communication module based on a reception intensity of the signal of the first communication network, or based on at least one of the signal of the first communication network and the paging signal of the second communication network.

According to various embodiments, when the signal of the second communication network is a signal for a voice service, the communication control module may receive the signal of the second communication network in preference to the signal of the first communication network through at least one of the first communication module and the second communication module.

According to various embodiments, the electronic device includes the transmission module for transmitting the signal to the CS network or the PS network and the first reception module and the second reception module for receiving the signals from the CS network and the PS network. When the transmission module transmits a first CS network signal to the CS network, the communication control module may at least temporarily receive a second CS network signal from the CS network through the first reception module and the second reception module and may at least temporarily receive a first PS network signal from the PS network through the second reception module.

Figure 12:
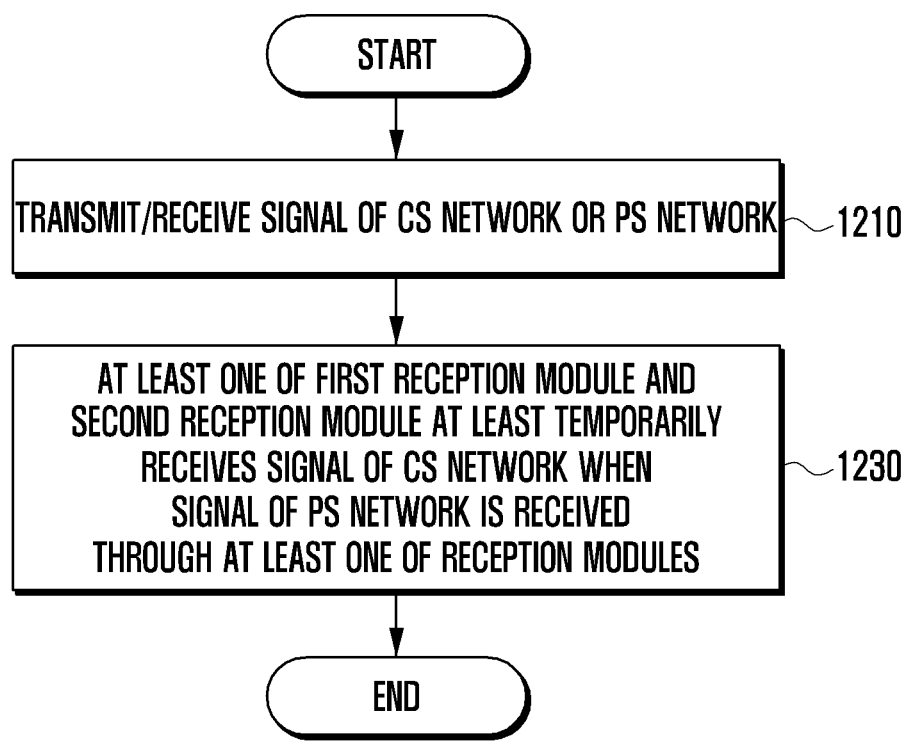
FIG. 12 illustrates a flowchart of a communication method of an electronic device according to various embodiments of the present disclosure.

FIG. 12 illustrates a flowchart of a communication method of the electronic device (for example, electronic device 1000). In step 1210, the transmission module (for example, transmission module 1013) of the electronic device 1000 transmits the signal to the CS network or the PS network and the reception module (for example, first reception module 1015 and the second reception module 1017) of the electronic device 1000 receives the signal (for example, at least one of the data communication signal, the broadcast signal, and the multicast signal) from the CS network or the PS network.

In step 1230, when the signal of the PS network is received through at least one of the first reception module 1015 and the second reception module 1017, at least one of the reception modules 1015 and 1017 of the electronic device 1000 may at least temporarily receive the signal of the CS network. For example, when the signal of the PS network is received through the first reception module 1015 or the second reception module 1017, the signal of the PS network may be received through the first reception module 1015 and the second reception module 1017 and at least one of the first reception module 1015 and the second reception module 1017 may at least temporarily receive the signal of the CS network.

According to various embodiments, the communication method of the electronic device may include an operation of transmitting the signal to the CS network or the PS network and an operation of receiving the signal from the CS network or the PS network by the first reception module or the second reception module. When the signal of the PS network is received through at least one of the first reception module and the second reception module, the receiving operation may include an operation of at least temporarily receiving the signal of the CS network by at least one of the first reception module and the second reception module.

According to various embodiments, when the signal of the CS network is received through at least one of the first reception module and the second reception module, the receiving operation may include an operation in which at least one of the first reception module and the second reception module may at least temporarily receive the signal received from the PS network in preference to the signal received from the CS network.

Figure 13A:
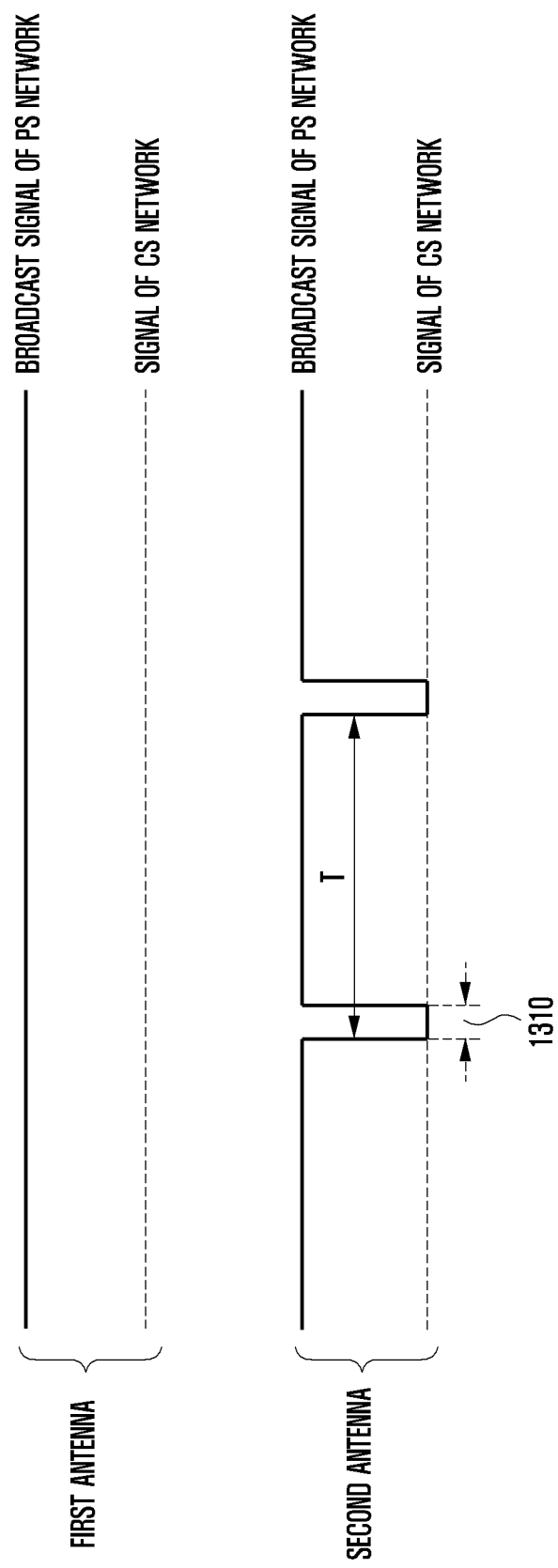
FIGS. 13A and 13B illustrate, when a paging signal of one communication network is received, data throughput of another communication network according to various embodiments of the present disclosure.
Figure 13B:
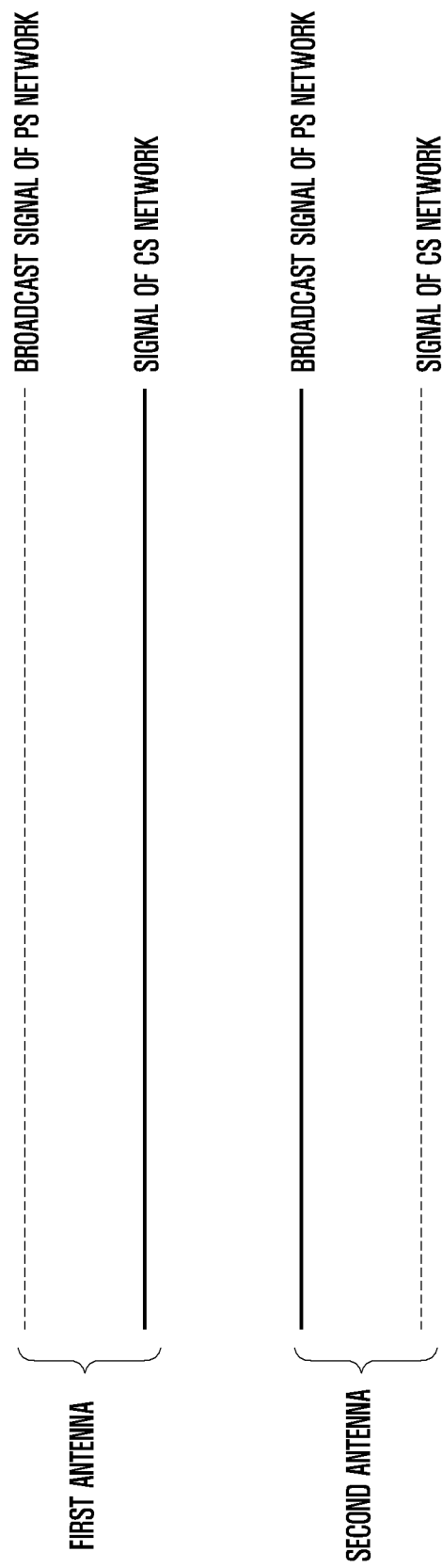

FIGS. 13A and 13B are timing charts illustrating a signal flow in which the signal of the first communication network (for example, the CS network) is received or transmitted/received when the electronic device (for example, electronic device 400 of FIG. 4) does not receive a PS network data communication signal of the second communication network (for example, the PS network) but receives the broadcast signal. In FIGS. 13A and 13B, a solid line indicates a signal of the communication network which the electronic device 400 currently receives and a dotted line indicates a signal which the electronic device 400 does not currently receive but will be able to receive. Concepts of the solid line and the dotted line in the timing chart will be identically applied to FIGS. 14A and 14B below.

Referring to FIG. 13A, the LTE system (communication control module 450) may receive the broadcast signal of the PS network through the transmission/reception antenna (for example first antenna 473 of FIG. 4) and the reception antenna (for example, second antenna 475 of FIG. 4). Further, the communication control module 450 may monitor the paging signal of the CS network by using the second antenna 475. For example, the communication control module 450 receives the broadcast signal of the PS network through the second antenna 475 and then receives the paging signal of the CS network for a predetermined time 1310 on a specified period (T). The communication control module 450 may switch a reception mode to receive the monitored paging signal (for example, paging signal of the CS network). Referring to FIG. 13B, the communication control module 450 may transmit the signal of the CS network by controlling the transmission/reception module 410 and continuously receive the broadcast signal of the PS network by controlling the first reception module 430.

The broadcast signal (for example, a signal received through a Broadcast CHannel (BCH) of LTE) may be received by the reception antenna (for example, second antenna 475 of FIG. 4) in a time division scheme. Accordingly, the communication control module 450 may receive the signal of the CS network through the reception antenna in an interval (for example, 2 to 3 ms) where the broadcasting signal is not received.

Figure 14A:
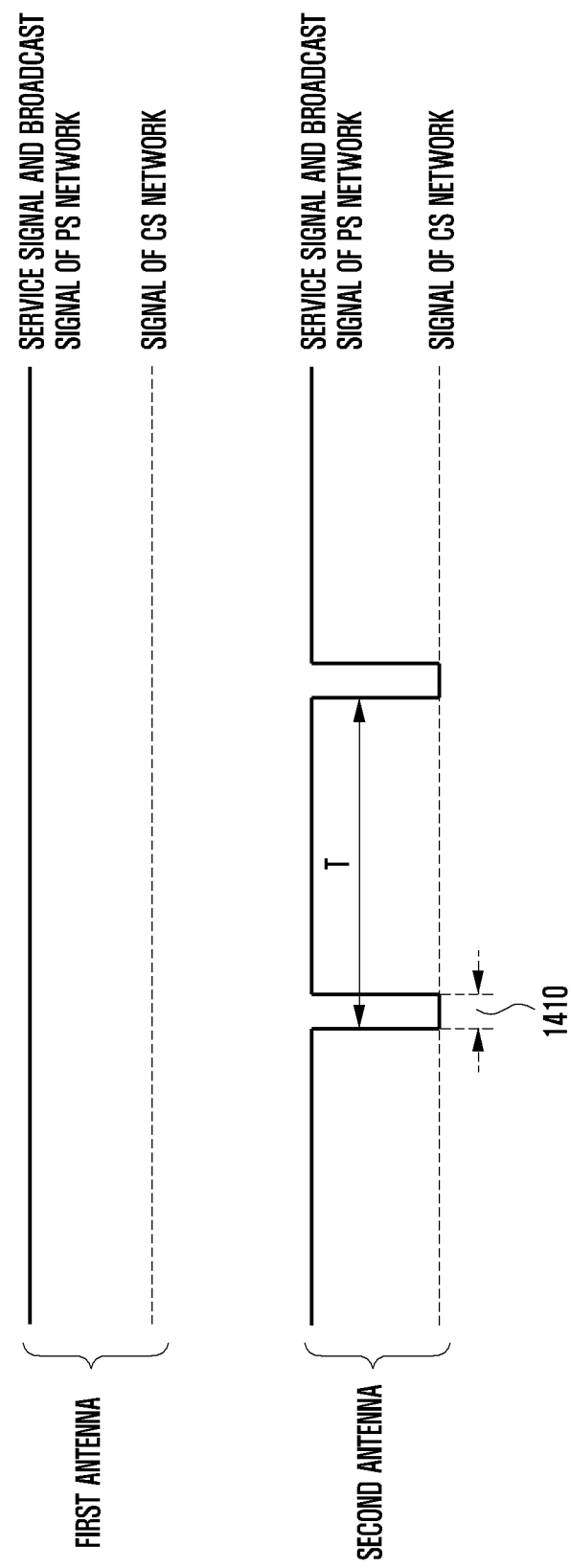

FIGS. 14A and 14B are timing charts illustrating a signal flow where the signal of the first communication network (for example, the CS network) is received when both a PS network data communication signal and the broadcast signal of the second communication network (for example, the PS network) are received. Referring to FIG. 14A, the communication control module 450 may receive the data communication signal (downlink signal) of the PS network through the first antenna 473 and the second antenna 475. Further, the communication control module 450 may transmit the data communication signal (uplink signal) of the PS network through the first antenna 473. In addition, the communication control module 450 may monitor the paging signal of the CS network by using the second antenna 475. For example, the communication control module 450 may receive the data communication signal and the broadcast signal of the PS network through the second antenna 475 and then receive the paging to signal of the CS network for a predetermined time 1410 on a specified period (T). Referring to FIG. 14B, the communication control module 450 may transmit the signal of the CS network by controlling the transmission/reception module 410 and continuously receive the signal of the PS network (for example, the broadcast signal or the multicast signal) by controlling the first reception module 430.

Figure 15:
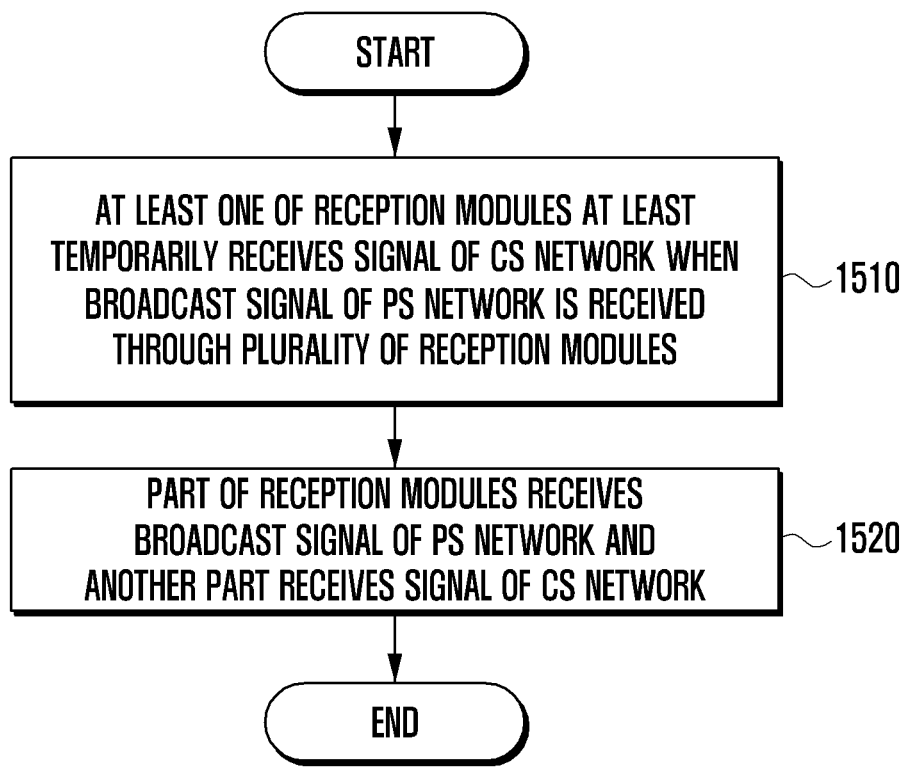
FIG. 15 illustrates a flowchart of a communication method using an electronic device according to various embodiments of the present disclosure.

FIG. 15 illustrates a flowchart of a communication method of the electronic device according to various embodiments. In step 1510, when the broadcast signal or the multicast signal of the PS network is received through a plurality of reception modules (for example, the first reception module 1015 and the second reception module 1017) of the electronic device 1000, at least one of the reception modules 1015 and 1017 of the electronic device 1000 may at least temporarily receive the signal of the CS network. In step 1520, a part (for example, the first reception module 1015) of the reception modules of the electronic device may continuously maintain reception of the broadcast signal or the multicast signal of the PS network, and another part (for example, the second reception module 1017) may stop receiving the broadcast signal or the multicast signal of the PS network and receive the signal of the CS network.

Figure 16:
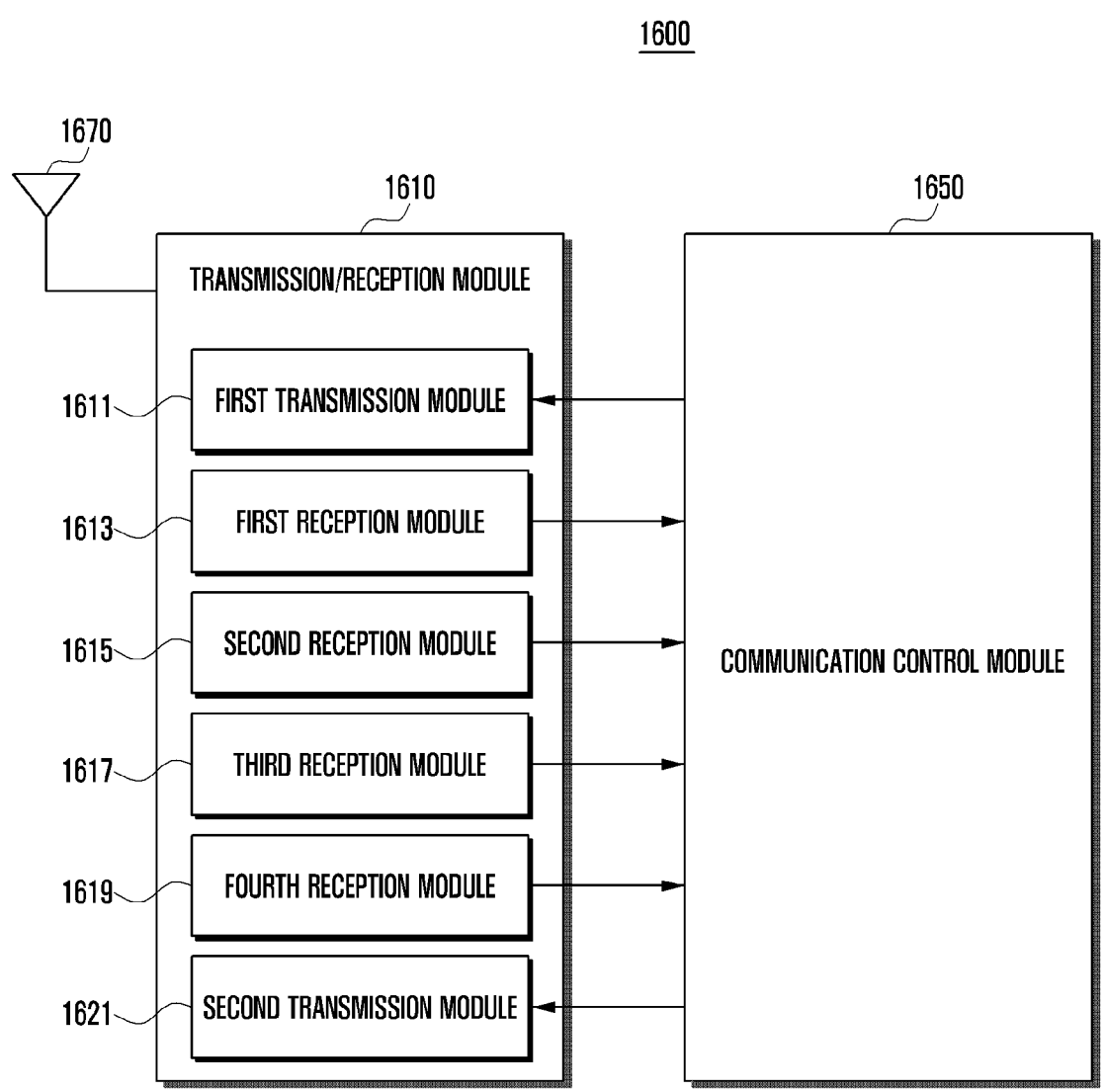
FIG. 16 is a block diagram of an electronic device according to various embodiments of the present disclosure.

Hereinafter, an electronic device 1600 according to various embodiments of the present disclosure will be described with reference to FIG. 16. Descriptions of parts of the electronic device 1600 identical or similar to the electronic device 400, the electronic device 800 or the electronic device 1000 will be omitted. FIG. 16 is a block diagram of the electronic device 1600 (for example, electronic device 201) and includes a transmission/reception module 1610, a communication control module 1650, and an antenna 1670.

According to an embodiment, the transmission/reception module 1610 includes a first transmission module 1611, a first reception module 1613, a second reception module 1615, a third reception module 1617, a fourth reception module 1619, and a second transmission module 1621. According to an embodiment, the transmission/reception module 1610 may include a plurality of sub transmission/reception modules. For example, the transmission/reception module 1610 may include a first sub transmission/reception module including the first transmission module 1611, the first reception module 1613, and the second reception module 1615, and a second sub transmission/reception module including the second transmission module 1621, the third reception module 1617, and the fourth reception module 1619. The antenna 1670 may include a plurality of antennas. For example, the antenna 1670 may change a number of antennas or a configuration thereof according to a frequency characteristic supported by the electronic device 1600 or a design scheme.

According to an embodiment, when the signal of the first communication network (for example, PS network) is received through at least one of the first reception module 1613 to the fourth reception module 1619, at least one of the first reception module 1613 to the fourth reception module 1619 may at least temporarily receive the signal of the second communication network (for example, CS network) in preference to the signal of the first communication network. For example, the communication control module 1650 controls the transmission/reception module 1610 such that the electronic device 1600 receives the paging signal of the second communication network according to a period of the paging signal of the second communication network while communicating with the first communication network.

According to an embodiment, when the communication control module 1650 communicates in a downlink CA method, the communication control module 1650 controls such that the reception module 1613 and the second reception module 1615 receive a first signal (for example, Pcell signal) of the PS network and the third reception module 1617 and the fourth reception module 1619 receive a second signal (for example, Scell signal) of the PS network. In this event, the communication control module 1650 controls such that at least one of the first reception module 1613 to the fourth reception module 1619 at least temporarily receives the signal of the CS network in preference to the signal of the PS network. In this event, the communication control module 1650 determines at least one reception module to receive the signal of the CS network based on a quality of a characteristic (for example, signal intensity or reception rate) of the signal received by each of the reception modules. Alternatively, when the second signal of the PS network is not received (for example, when Scell add or activation is not performed), the communication control module 1650 may control to receive the signal of the CS network by using at least one of the third reception module 1617 and the fourth reception module 1619.

Figure 17:
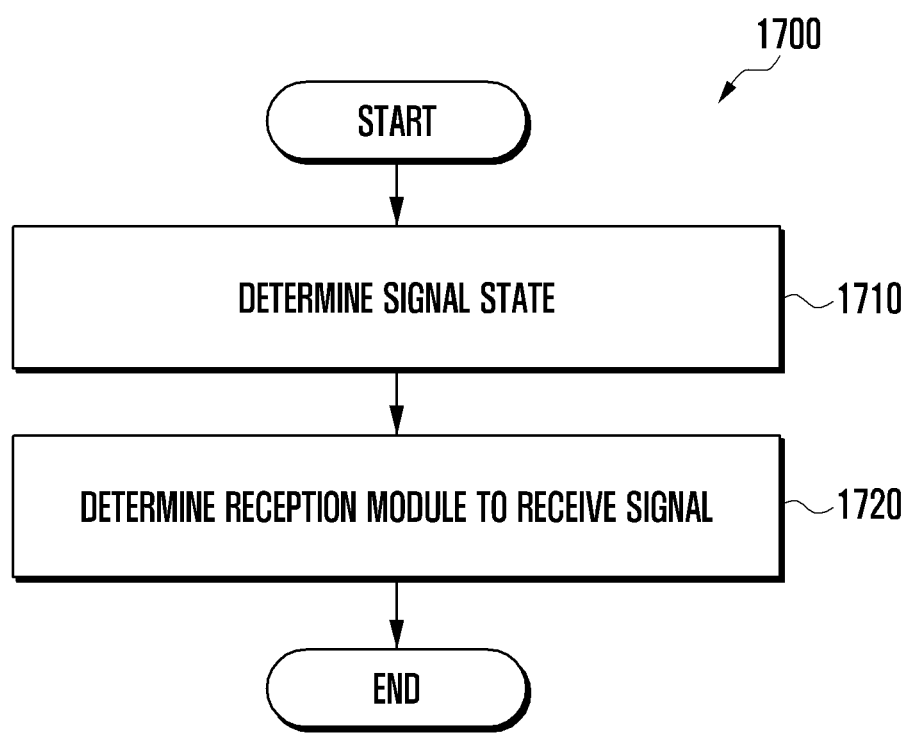
FIG. 17 illustrates a flowchart of a communication method of an electronic device according to various embodiments of the present disclosure.

FIG. 17 illustrates a flowchart of a communication method of the electronic device (for example, electronic device 400, 800, or 1000) according to various embodiments. In step 1701, the electronic device (utilizing, for example, first communication control module 451) determines a state of a signal based on a signal received through at least one reception module (for example, the reception module 415 or the first reception module 430). The electronic device may determine a state of a signal based on a signal of the CS network or the PS network received through at least one of the reception module 415 and the first reception module 430. For example, the electronic device may determine s state of a signal through an intensity of the signal (for example, paging signal, broadcast control channel signal, pilot channel signal, or Common Pilot CHannel (CPCH) signal) received through the at least one reception signal (for example, Received Signal Strength Indicator (RSSI) or Reference Signal Received Power (RSRP)) or a communication quality (for example, Bit Error Rate (BER) or Packet Error Rate (PER)) periodically or aperiodically. Alternatively, the electronic device may monitor a state of a signal (for example, intensity of the received signal) through the at least one reception module periodically or aperiodically. For example, the electronic device may monitor the intensity of the signal received through the at least one reception module before or after the paging signal.

In step 1730, the electronic device determines a reception module for receiving a signal among the at least one reception module. According to an embodiment, when a signal state (for example, signal state of the CS network) of the reception module 415 and the first reception module 430 is large enough to provide the communication service (for example, an intensity of the received signal is sufficiently large or communication quality is within a designated range), the electronic device receives a signal (for example, paging signal of the CS network) through at least one of the reception module 415 and the first reception module 430. For example, the electronic device may at least temporarily receive the paging signal of the CS network through a reception module having a relatively worse signal state for the CS network between the reception module 415 and the first reception module 430 while receiving the signal of the PS network through the reception module 415 and the first reception module 430.

According to an embodiment, when the signal of at least one of the reception module 415 and the first reception module 430 is in a state where a communication service cannot be provided, the electronic device may receive the signal (for example, paging signal of the CS network) through a reception module having a relatively better signal state between the reception module 415 and the first reception module 430. For example, the electronic device may at least temporarily receive the paging signal of the CS network through the reception module having the relatively better signal state for the CS network between the reception module 415 and the first reception module 430 while receiving the signal of the PS network through reception module 415 and the first reception module 430.

According to an embodiment, when the state of the signal of the reception module 415 and the first reception module 430 is outside a designated range (for example, when the state of the signal is poor or bad), the electronic device may receive the signal (for example, paging signal of the CS network) through the reception module 415 and the first reception module 430.

According to an embodiment, the electronic device may receive a first paging signal of the CS network through the first reception module 430. The electronic device may determine a state of the signal of the CS network based on the first paging signal. The electronic device may determine a reception module to receive a second paging signal of the CS network based on the state of the signal. For example, when the electronic device fails to receive the first paging signal (for example, a designated number of times or more or for a designated time period) or an intensity of the first paging signal is within a designated range, the electronic device may receive the second paging signal by changing the first reception module to receive the second paging signal from the first reception module 430 to the reception module 415. According to an embodiment, when the electronic device fails to receive the second paging signal through the reception module 415 or an intensity of the second paging signal is within a designated range, the electronic device may receive a third paging signal of the CS network through the reception module 415 and the first reception module 430.

The embodiments of the present disclosure disclosed in this specification and the accompanying drawings are merely particular examples provided in order to clearly describe the technical contents of the present disclosure and help in an understanding of the present disclosure, and are not intended to limit the scope of the present disclosure. Accordingly, the scope of the present disclosure should be construed that all modifications or modified forms derived based on the technical idea of the present disclosure are included in the scope of the present disclosure, as defined by the claims and their equivalents.

What is claimed is:

1. An electronic device comprising:
   a transmission module for transmitting signals to at least one of a Circuit Switching (CS) network and a Packet Switching (PS) network;
   a first reception module;
   a second reception module;
   a first antenna;
   a second antenna;
   a third reception module;
   a fourth reception module; and
   a communication control module for controlling the transmission module, the first reception module, and the second reception module,
   wherein, when a signal of the PS network is received through at least one of the first reception module and the second reception module, the communication control module controls at least one of the first reception module and the second reception module to at least temporarily receive a signal from the CS network,
   wherein, when an intensity of the signal of the CS network received through one of the first antenna and the second antenna is within a designated range, the communication control module controls the other of the first antenna and the second antenna to receive an additional signal of the CS network, and
   wherein the communication control module controls at least one of the first reception module and the second reception module to receive a first signal from the PS network and controls at least one of the third reception module and the fourth reception module to receive a second signal from the PS network.

2. The electronic device of claim 1, wherein the first signal and the second signal include different pieces of information related to the PS network.

3. The electronic device of claim 1, wherein, when at least one of the third reception module and the fourth reception module is not receiving the second signal, the communication control module controls the at least one of the third reception module and the fourth reception module not receiving the second signal to receive a signal from the CS network.

4. The electronic device of claim 1, wherein the communication control module controls at least one of the first, second, third, and fourth reception modules to receive a signal from the CS network, based on at least one of a quality of the first signal and a quality of the second signal.

5. The electronic device of claim 1, wherein, the communication control module controls the first reception module to receive the signal from the PS network and controls the second reception module to at least temporarily receive the signal from the CS network.

6. The electronic device of claim 5, wherein, when an intensity of the signal received from the CS network by the second reception module is within a designated range or the signal is not received, the communication control module controls the first reception module to at least temporarily receive an additional signal from the CS network.

7. The electronic device of claim 1, wherein, when the signal of the CS network is received through at least one of the first reception module and the second reception module, the communication control module controls at least one of the first reception module and the second reception module to at least temporarily receive the signal from the PS network.

8. The electronic device of claim 1, wherein, when the signal of the CS network is received through at least one of the first reception module and the second reception module, the communication control module controls the first reception module to receive the signal from the CS network and controls the second reception module to at least temporarily receive the signal from the PS network.

9. The electronic device of claim 1, wherein, when the signal of the CS network is received through at least one of the first reception module and the second reception module, the communication control module determines whether to receive the signal from the PS network through at least one of the first reception module and the second reception module based on a reception intensity of the signal received from the CS network.

10. The electronic device of claim 1, wherein the communication control module controls at least one of the first reception module and the second reception module to receive an additional signal from the CS network, based on the signal of the CS network received through at least one of the first reception module and the second reception module.

11. The electronic device of claim 1, wherein, when the signal from the CS network is received through the first reception module and the second reception module and an intensity of the signal is within a designated range, the communication control module controls one of the first reception module and the second reception module having a smaller signal intensity to receive an additional signal from the CS network.

12. The electronic device of claim 1, wherein the communication control module determines whether to at least temporarily receive the signal from the PS network through at least one of the first reception module and the second reception module based on at least one of paging signals received from the CS network and the PS network.

13. The electronic device of claim 1, wherein, when paging signals received from the CS network and the PS network overlap, the communication control module controls one of the first reception module and the second reception module to receive the paging signal of the CS network instead of the paging signal of the PS network.

14. The electronic device of claim 1, wherein, when the signal received by at least one of the first reception module and the second reception module is switched from the signal received from the PS network to the signal received from the CS network or from the signal received from the CS network to the signal received from the PS network, the communication control module provides a feedback to the CS network or the PS network.

15. The electronic device of claim 1, wherein at least one of the first reception module and the second reception module is configured by a Multi-Input Multi-Output (MIMO) scheme and receives the signal from the PS network in one of a first reception mode and a second reception mode based on a paging signal received from the CS network.

16. The electronic device of claim 1, wherein, when at least one of the first reception module and the second reception module receives a paging signal of the CS network, the communication control module provides a feedback to the PS network before the paging signal of the CS network is received.

17. The electronic device of claim 1, wherein the communication control module includes a first modem for processing the signal received from the CS network and a second modem for processing the signal received from the PS network.

18. The electronic device of claim 17, wherein, when a paging signal is received from the CS network, the first modem provides a feedback of the reception of the paging signal to the second modem.

19. The electronic device of claim 1, wherein the first antenna and the second antenna have equal receiving sensitivities or a difference of the receiving sensitivities of the first antenna and the second antenna is within 3 dB.

20. The electronic device of claim 1, wherein the communication control module receives at least one of a unicast signal, a broadcast signal, and a multicast signal through at least one of the first reception module and the second reception module, as the signal of the PS network.

21. The electronic device of claim 20, wherein, when the signal of the CS network is received through one of the first reception module and the second reception module, the communication control module controls the other of the first reception module and the second reception module to receive at least one of the broadcast signal and the multicast signal of the PS network.

22. The electronic device of claim 20, wherein the communication control module controls at least one of the first reception module and the second reception module to receive the signal of the CS network in an interval where the broadcast signal is not received.

23. An electronic device comprising:
a transmission module for transmitting signals to at least one of a Circuit Switching (CS) network and a Packet Switching (PS) network;
a first reception module;
a second reception module;
a first antenna;
a second antenna; and
a communication control module for controlling the transmission module, the first reception module, and the second reception module,
wherein, when a signal of the PS network is received through at least one of the first reception module and the second reception module, the communication control module controls at least one of the first reception module and the second reception module to at least temporarily receive a signal from the CS network, and
wherein, when an intensity of the signal of the CS network received through one of the first antenna and the second antenna is within a designated range, the communication control module controls the other of the first antenna and the second antenna to receive an additional signal of the CS network,
wherein the communication control module receives at least one of a unicast signal, a broadcast signal, and a multicast signal through at least one of the first reception module and the second reception module, as the signal of the PS network, and
wherein, when at least one of the broadcast signal and the multicast signal of the PS network is received through the first reception module and the second reception module and then the signal of the CS network is received through one of the first reception module and the second reception module, the communication control module maintains reception of at least one of the broadcast signal and the multicast signal of the PS network through the other of the first reception module and the second reception module.

24. An electronic device comprising:
a transmission module for transmitting signals to at least one of a Circuit Switching (CS) network and a Packet Switching (PS) network;
a first reception module;
a second reception module;
a first antenna;
a second antenna; and
a communication control module for controlling the transmission module, the first reception module, and the second reception module,
wherein, when a signal of the PS network is received through at least one of the first reception module and the second reception module, the communication control module controls at least one of the first reception module and the second reception module to at least temporarily receive a signal from the CS network, and
wherein, when an intensity of the signal of the CS network received through one of the first antenna and the second antenna is within a designated range, the communication control module controls the other of the first antenna and the second antenna to receive an additional signal of the CS network,
wherein the communication control module receives at least one of a unicast signal, a broadcast signal, and a multicast signal through at least one of the first reception module and the second reception module, as the signal of the PS network, and
wherein, when the unicast signal and the broadcast signal or the multicast signal of the PS network are received through the first reception module and the second reception module and then the signal of the CS network is received through one of the first reception module and the second reception module, the communication control module stops the reception of the unicast signal of the PS network through the other of the first reception module and the second reception module and maintains the reception of the broadcast signal or the multicast signal of the PS network.

25. A method of an electronic device, comprising:
transmitting a signal to one of a Circuit Switching (CS) network and a Packet Switching (PS) network;
receiving a signal from the PS network through at least one of a first reception module and a second reception module;
at least temporarily receiving a signal from the CS network through at least one of the first reception module and the second reception module;
when an intensity of the signal of the CS network received through one of a first antenna and a second antenna is within a designated range, receiving, by the other of the first antenna and the second antenna, an additional signal of the CS network;

receiving through at least one of the first reception module and the second reception module a first signal from the PS network; and receiving through at at least one of a third reception module and a fourth reception module a second signal from the PS network.

\* \* \* \* \*